US009112640B2

(12) United States Patent
Nazarathy et al.

(10) Patent No.: US 9,112,640 B2
(45) Date of Patent: Aug. 18, 2015

(54) OPTICAL NETWORK UNIT, OPTICAL ACCESS NETWORK AND A METHOD FOR EXCHANGING INFORMATION

(71) Applicant: Technion Research and Development Foundation LTD., Haifa (IL)

(72) Inventors: Moshe Nazarathy, Haifa (IL); Amos Agmon, Kiriat Tivon (IL)

(73) Assignee: Technion Research and Development Foundation LTD., Haifa (IL)

( * ) Notice: Subject to any disclaimer, the term of this patent is extended or adjusted under 35 U.S.C. 154(b) by 0 days.

(21) Appl. No.: 14/207,676

(22) Filed: Mar. 13, 2014

(65) Prior Publication Data

US 2014/0270769 A1 Sep. 18, 2014

Related U.S. Application Data

(60) Provisional application No. 61/787,404, filed on Mar. 15, 2013.

(51) Int. Cl.
*H04J 14/00* (2006.01)
*H04J 14/06* (2006.01)
*H04J 14/02* (2006.01)

(52) U.S. Cl.
CPC ............. *H04J 14/06* (2013.01); *H04J 14/0282* (2013.01)

(58) Field of Classification Search
CPC ............................ H04J 14/06; H04J 14/0282
See application file for complete search history.

(56) References Cited

U.S. PATENT DOCUMENTS

| 7,197,205 | B1* | 3/2007 | BuAbbud ........................ 385/24 |
| 2008/0138070 | A1* | 6/2008 | Yan et al. ........................ 398/65 |
| 2011/0268459 | A1* | 11/2011 | Rollins et al. ................. 398/208 |
| 2011/0318005 | A1* | 12/2011 | Yoshihara ....................... 398/45 |
| 2012/0207475 | A1* | 8/2012 | Tian et al. ....................... 398/65 |
| 2013/0216228 | A1* | 8/2013 | Nazarathy et al. .............. 398/65 |
| 2014/0270769 | A1* | 9/2014 | Nazarathy et al. .............. 398/65 |

* cited by examiner

*Primary Examiner* — Danny Leung
(74) *Attorney, Agent, or Firm* — Reches Patents

(57) ABSTRACT

A method for exchanging information with an Optical Network Unit (ONU), the method comprising: receiving, by the ONU, downstream signals that comprise a pilot signal and downstream information signals; wherein the downstream information signals embed first polarization modulated information and second polarization modulated information; wherein the pilot signal is received at a pilot frequency slot and the downstream information signals are received at a downstream information frequency slot that differs from the pilot frequency slot; splitting the downstream signals to first, second, third and fourth sets of signals; wherein the splitting comprises performing a polarization based splitting to provide first and second intermediate sets of signals; wherein the first and second sets of signals originate from the first intermediate set of signals and the third and fourth sets of signals originate from the second intermediate set of signals; generating a fifth set of signals by providing the second and fourth sets of signals to a polarization changing circuit, wherein a polarization direction of the fifth set of signals differs from a polarization direction of the first and second intermediate sets of signals; generating first, second and third sets of detection signals, in response to the first, third and fifth sets of signals; and reconstructing the first polarization modulated information and the second polarization modulated information in response to the first, second and third sets of detection signals.

24 Claims, 12 Drawing Sheets

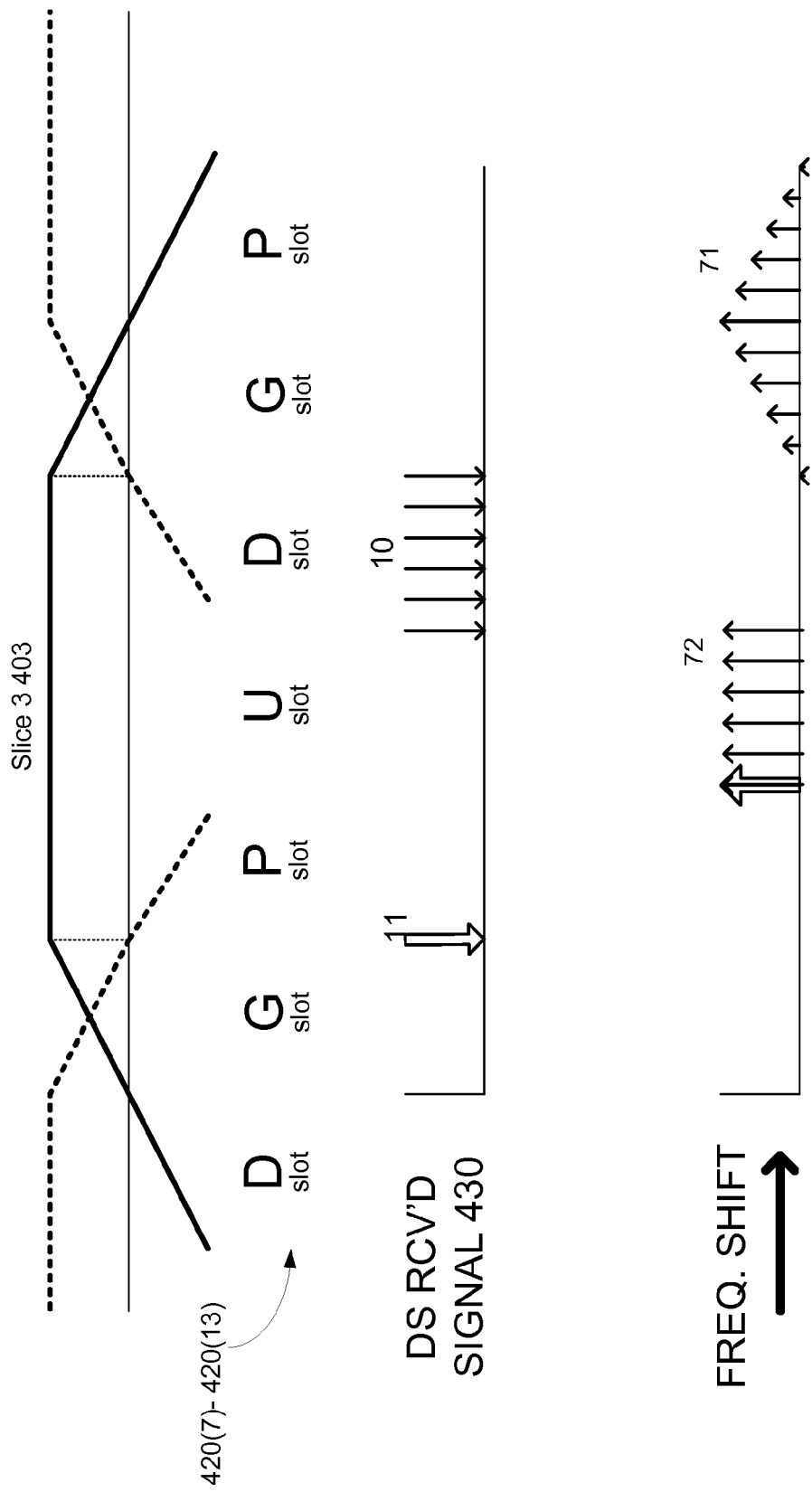

OPTICAL NETWORK UNIT, OPTICAL ACCESS NETWORK AND A METHOD FOR EXCHANGING INFORMATION

RELATED APPLICATIONS

This application claims priority from US provisional patent application filing date Mar. 15, 2013 Ser. No. 61/787,404 which is incorporated herein by reference.

FIELD OF THE INVENTION

This application relates to Optical Access Networks such as but not limited to a Passive Optical Network (PON) with a laserless, colorless, low-cost ONU (Optical Network Unit, the endpoint equipment), capable of very-high and flexible data throughput.

BACKGROUND OF THE INVENTION

Unlike coherent (COH) detection, direct-detection (DD) does not straightforwardly support polarization multiplexing (POL-MUX) transmission of advanced modulation (ADV-MOD) formats (amplitude & phase or IQ). Multiple solutions have been proposed to nevertheless enable DD to support POL-MUX ADV-DD in order to attain substantially higher spectral efficiency (SE), which would be a laudable goal for applications wherein COH detection would be prohibitively expensive, such as in short-reach access and metro networks.

DD systems which detects signal phase in addition to its amplitude, akin to COH transmission, albeit without a local oscillator (LO) in the receiver (Rx), may be referred to as self-coherent (SCOH). There have been multiple approaches to attain SCOH [, . . . ].

One popular class of SCOH systems is based on remote (or self) heterodyne (HET), whereby the LO is effectively sent all the way from the transmitter (Tx) to the Rx, in the form of a pilot tone (p) offset by W from the transmitted data spectrum, where W is the bandwidth of the data (d). The spectral offset is required to accommodate the d×d term, whereas the desired COH-like p×d term in the photo-current is generated offset by W in the electrical domain. Such self-HET method has been proposed for DD OFDM transmission, but we mention here that it is also applicable to single-carrier rather than OFDM transmission. It may be used to detect ADV-MOD formats if the electrical signal is IQ demodulated. Unfortunately, just a single polarization may be effectively used for self-HET transmission due to a fundamental "remote LO-fading" limitation outlined below.

SUMMARY OF THE INVENTION

According to an embodiment of the invention a method may be provided for exchanging information over an Optical Access Network (OAN).

According to an embodiment of the invention there is provided an Optical Network Unit (ONU) that may include a port that is arranged to receive downstream signals that comprise a pilot signal and downstream information signals; wherein the downstream information signals embed first polarization modulated information and second polarization modulated information; wherein the pilot signal is received at a pilot frequency slot and the downstream information signals are received at a downstream information frequency slot that differs from the pilot frequency slot; a splitting module that is arranged to split the downstream signals to first, second, third and fourth sets of signals; wherein the splitting module comprises a polarization based splitter that is arranged to perform a polarization based splitting to provide first and second intermediate sets of signals; wherein the first and second sets of signals originate from the first intermediate set of signals and the third and fourth sets of signals originate from the second intermediate set of signals;

a polarization changing circuit that is arranged to receive the second and fourth sets of signals and to generate a fifth set of signals; wherein a polarization direction of the fifth set of signals differs from a polarization direction of the first and second intermediate sets of signals; a detection module that is arranged to generate first, second and third sets of detection signals, in response to the first, third and fifth sets of signals; and a reconstruction module that is arranged to reconstruct the first polarization modulated information and the second polarization modulated information in response to the first, second and third sets of detection signals.

The polarization changing circuit may be a coupler.

The coupler may include a first input, a second input and at least one output, wherein the first input may be arranged to receive the second set of signals, wherein the second input may be arranged to receive the fourth set of signals, and wherein the at least one output may be arranged to output fifth set of signals.

The third sets of detection signals represents (a) a set of sums of signals of the second and fourth sets of signals, and (b) a set of differences between the signals of the second and fourth sets of signals.

The detection module may include first, second and third detection circuits that are arranged to generate the first, second and third sets of detection signals, respectively.

The ONU may be a laserless ONU.

The ONU may be coupled to an Optical Line Terminal (OLT), wherein the OLT utilizes a OLT frequency range for communicating with the OLT and multiple additional ONUs, wherein a portion of the OLT frequency range may be allocated form upstream and downstream communication with the ONU; wherein the ONU may include a bandpass filter that passes downstream signals within a bandpass frequency range that may include the OLT frequency range.

The ONU further may include a polarization rotator that may be arranged to rotate a polarization of one of the first and second intermediate sets of signals.

The ONU may include modulator that may be arranged to modulate first and second downstream sets of signals to provide an upstream set of signals that may include upstream information signals; wherein the first downstream set of signals originates from the first intermediate set of signals and the second downstream set of signals originate from the second intermediate set of signals; and wherein the ONU may be further arranged to upstream transmit the upstream set of signals, The upstream set of signals may propagate through the splitting module.

The ONU may be arranged to transmit the upstream information signals at an upstream information frequency slot that differs from the downstream information frequency slot and from the pilot frequency slot.

The pilot frequency slot, the downstream information frequency slot, and the upstream information frequency slot may have a same bandwidth.

According to an embodiment a method may be provide and may include receiving, by the ONU, downstream signals that may include e a pilot signal and downstream information signals; wherein the downstream information signals embed first polarization modulated information and second polarization modulated information; wherein the pilot signal may be received at a pilot frequency slot and the downstream information signals are received at a downstream information frequency slot that differs from the pilot frequency slot; splitting the downstream signals to first, second, third and fourth sets of signals; wherein the splitting may include performing a polarization based splitting to provide first and second intermediate sets of signals; wherein the first and second sets of signals originate from the first intermediate set of signals and the third and fourth sets of signals originate from the second intermediate set of signals; generating a fifth set of signals by providing the second and fourth sets of signals to a polarization changing circuit, wherein a polarization direction of the fifth set of signals differs from a polarization direction of the first and second intermediate sets of signals; generating first, second and third sets of detection signals, in response to the first, third and fifth sets of signals; and reconstructing the first polarization modulated information and the second polarization modulated information in response to the first, second and third sets of detection signals.

The polarization changing circuit may be a coupler.

The generating of the fifth set of signals may include providing the second set of signals to a first input of the coupler, providing the fourth set of signals to a second input of the coupler; and wherein the fifth set of signals may be outputted by at least one output of the coupler.

The third sets of detection signals represents (a) a set of sums of signals of the second and fourth sets of signals, and (b) a set of differences between the signals of the second and fourth sets of signals.

The generating of the first, second and third sets of detection signals may be performed by first, second and third detection circuits respectively.

The ONU may be a laserless ONU.

The ONU may be coupled to an Optical Line Terminal (OLT), wherein the OLT utilizes a OLT frequency range for communicating with the OLT and multiple additional ONUs, wherein a portion of the OLT frequency range may be allocated form upstream and downstream communication with the ONU; wherein the method may include filtering the downstream signals by a bandpass filter that passes signals within a bandpass frequency range that may include the OLT frequency range.

The ONU further may include modulating first and second downstream sets of signals to provide an upstream set of signals that may include upstream information signals; wherein the first downstream set of signals originates from the first intermediate set of signals and the second downstream set of signals originate from the second intermediate set of signals; and upstream transmitting the upstream set of signals.

The upstream set of signals propagated through a splitting module that performs the splitting of the downstream signals.

The upstream information signals are transmitted at an upstream information frequency slot that differs from the downstream information frequency slot and from the pilot frequency slot.

The pilot frequency slot, the downstream information frequency slot, and the upstream information frequency slot have a same bandwidth.

The method further may include rotating by a polarization rotator a polarization of one of the first and second intermediate sets of signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 5, 6, 7A and 8 illustrate various signals according to various embodiments of the invention.

Figure 1A:
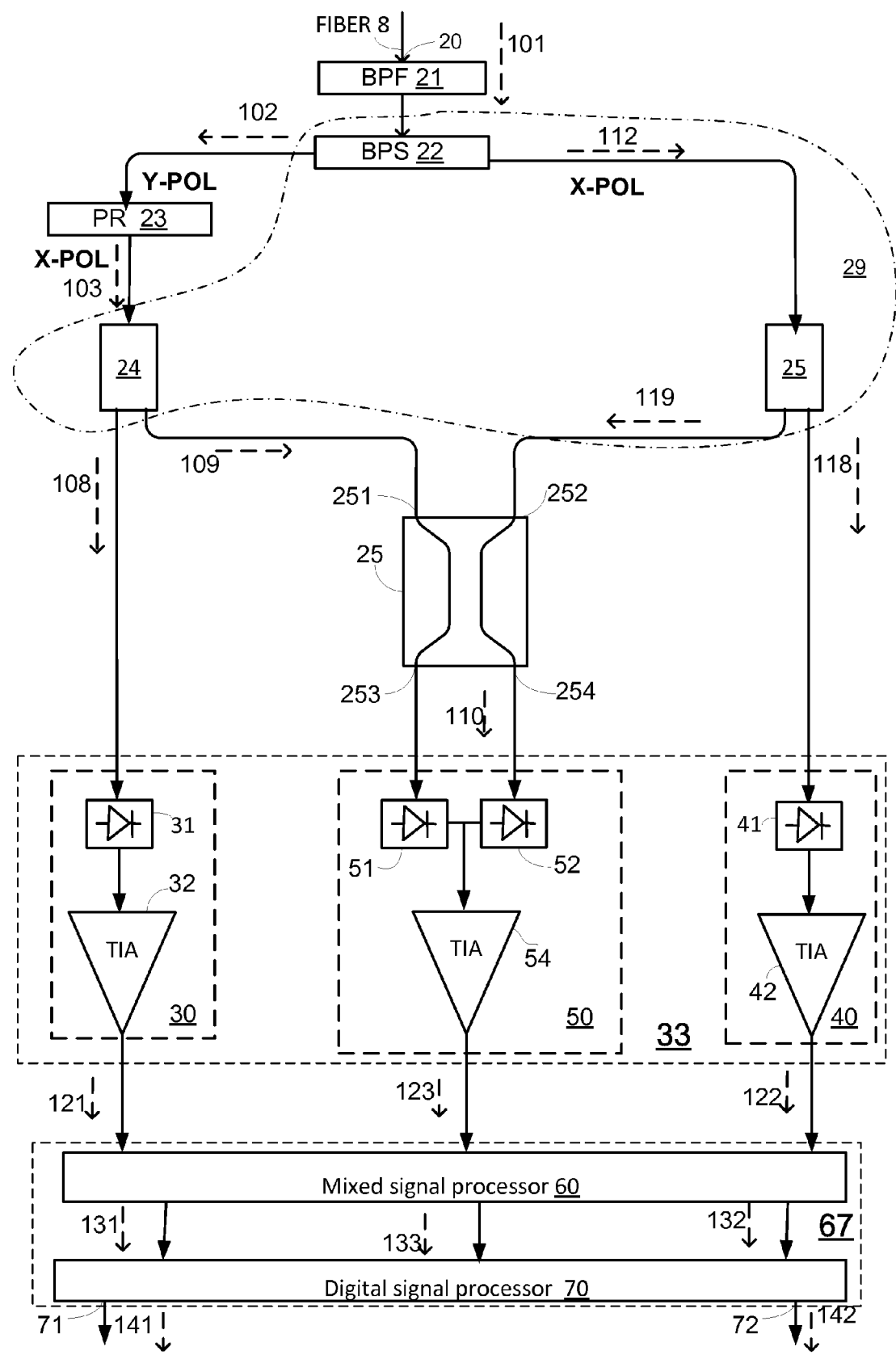
FIG. 1A illustrates a portion of an Optical Network Units (ONU) according to an embodiment of the invention.

It will be appreciated that for simplicity and clarity of illustration, elements shown in the Figures have not necessarily been drawn to scale. For example, the dimensions of some of the elements may be exaggerated relative to other elements for clarity. Further, where considered appropriate, reference numerals may be repeated among the Figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The drawings may be in scale or out of scale.

For clarity, non-essential elements were omitted from some of the drawings.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

LIST OF ABBREVIATIONS

ADC Analog to digital converter
BW Band-Width
DAC Digital to analog converter
DD Direct Detection
DS Down Stream
IF Intermediate Frequency
MIMO Multiple Input Multiple Output
OAN Optical Access Network
ONU Optical Network Unit (user equipment)
OLT Optical Line Terminal (central office equipment)
OFDM Orthogonal Frequency Division Multiplexing
PON Passive Optical Network
TIA Trans-impedance amplifier.
US Up Stream There are provided OANs, PONs, ONUs, OLTs and methods and especially a laserless, colorless, low-cost ONU capable of very-high and flexible data throughput.

For simplicity of explanation the following specification will refer to PON although any method, ONU, OLT and the like can be applied mutatis mutandis to any OAN.

As will be described in details in the following sections of this document, this aim may be achieved by a novel combination and application of at least some of the following.

Here we introduce a new relatively simple and robust Rx structure overcoming "remote LO-fading" thus enabling SCOH transmission of ADV-MOD formats such as 16-QAM with POL-MUX, doubling the data rate with respect to previous self-HET solutions, by sending independent ADV-MOD data streams over the two orthogonal POLs (with no LO in the receiver).

The system is applicable to short-haul or medium-haul point-to-point or point-to-multipoint optical links as well as to two-way access networks, such as Passive Optical Networks.

The Remote LO-Fading IImrtation

A fundamental problem arises for self-HET with remote-LO due to the random POL rotation of the remote-LO pilot. As the state-of-polarization (SOP) of the remote LO pilot may be received at arbitrary orientation relative to the principal axes of the POL beam-splitter (PBS) in the Rx, it is possible that the pilot SOP is (nearly) orthogonal to one of the PBS axes, in which case COH-like HET reception (mixing product of signal and remote LO) for that polarization breach is severely degraded, and it is impossible to detect the two independent data streams carried over the two POLs. This problem, referred to here as remote-LO fading, precludes consistently multiplexing independent data over the two POLs. Instead one must adopt either POL-independent detection or use POL-diversity, transmitting the same data on both POL, losing a factor-of-two in the data rate. There have been multiple approaches proposed to overcome the remote-LO fading problem, especially in the context of PON access, but unfortunately, none of these solutions yet offers satisfactory performance-complexity tradeoffs.

We propose and simulate a simple novel modification to the conventional SCOH HET Rx structure. Essentially an extra 3 dB coupler, a photo-diode (PD) balanced pair, a TIA, an extra ADC and two extra complex multipliers in the DSP, is all it takes to make the second POL usable, doubling data rates of ADV-MOD formats over DD links.

Here we overview the Rx structure. The resulting SCOH dual-POL Rx comprises a modified optical front-end (FE) which has about the same complexity as a single conventional 90 deg optical hybrid in a conventional homodyne COH Rx (for a single POL there, although we carry both POLs here, but of course without the need of an LO source at the receiver).

The trend is to photonically integrate the COH hybrid components—the same may be extended to the proposed SCOH Rx FE, which features some optical interconnects as shown, four PDs arrayed as two single-ended PDs and a balanced PD (BPD) pair, followed by 3 Trans-Impedance Amplifiers (TIA) feeding 3 analog-digital-converters (ADC). The DSP per branch includes conventional DSP-FE functions, the three respective outputs, u[t], v[t], w[t], of which, are inserted into a 3×2 MIMO digital equalizer (EQZ) module producing two decoupled POL streams, $d_x[t], d_y[t]$ to be further processed in two conventional Rx DSP back-end (BE) for recovery of the two independent data streams. The MIMO EQZ has its coefficients adaptively adjusted, e.g. by means of Least-Mean-Square (LMS) data-aided algorithm, as simulated further below.

The proposed self-coherent receiver is able to carry advanced modulation formats such as 16-QAM over dual polarizations, thus yielding high spectral efficiency, is likely to be useful in cost-effective PON and metro systems.

There is illustrated a self-heterodyne with effective LO as remotely transmitted pilot is degraded by pilot polarization (POL) fading, precluding POL-mux. We mitigate this effect via a novel slightly more complex optical front-end plus 3×2 adaptive MIMO processing.

According to an embodiment of the invention the ONU is arranged to apply reflective re-modulation in the US direction (see, for example FIG. 2A-2B), thus allowing colorless and laserless ONU operation while preventing unwanted interaction between US and DS modulations and also prevent Rayleigh back-scattering interference The application of self-coherent detection may eliminate the need for a local oscillator (laser) in the receiver and the reflective re-modulation of the novel spectral structure eliminates the need for a laser in the transmitter, this allowing the realization of a laserless ONU.

Aside from the laserless ONU design, to alternative ONU design options are given incorporating a laser source for the use in the receiver and additionally or alternatively transmitter.

FIG. 1 illustrates a portion 10 of an ONU according to an embodiment of the invention. The ONU may include additional portions and/or components such as but not limited to a transmitter.

Portion 10 includes the following components:
a. Port 20.
b. Bandpass filter (BPF) 21.
c. Polarization module 29 that may include polarization based splitter (BPS) 22 and power splitters 24 and 25.
d. Polarization rotator 23.
e. Polarization changing circuit such as coupler 25.
f. Detection module 33 that may include first, second and third detection circuits 30, 50 and 50.

g. Reconstruction module 67 that may include mixed signal processor 60 and a digital signal processor 70 that may be a MIMO digital signal processor.

FIG. 1 also illustrates the following signals:

101 Downstream signals (including pilot signal and downstream information signals).
102 First intermediate set of signals.
103 Polarization rotated intermediate set of signals.
108 First set of signals.
109 Second set of signals.
110 Fifth set of signals.
112 Second intermediate set of signals.
118 Third set of signals.
119 Fourth set of signals.
121 First set of detection signals.
122 Second set of detection signals.
123 Third set of detection signals.
131 First digital set of detection signals.
132 Second digital set of detection signals.
133 Third digital set of detection signals.
141 Reconstructed first polarization modulated information.
142 Reconstructed second polarization modulated information.

The bandpass filter 21 may be very wide—it will enable the passage of downstream signals of any frequency that is being used by an OLT. In this sense the ONU is colorless-different ONUs that are allocated different frequencies may use the same bandpass filter 21. The bandpass filter 21 may be used to reduce the overall noise by reducing the bandwidth of the ONU.

The port 20 is arranged to receive downstream signals 101 that includes a pilot signal and downstream information signals. The downstream information signals embed first polarization modulated information and second polarization modulated information. The pilot signal is received at a pilot frequency slot and the downstream information signals are received at a downstream information frequency slot that differs from the pilot frequency slot. See, for example pilot frequency slots (P slots) and downstream information frequency slots (D slots) of FIGS. 5, 6 and 7A.

The splitting module 29 is arranged to split the downstream signals to first, second, third and fourth sets of signals 108, 109, 118 and 119.

The splitting module 29 includes polarization based splitter 22 that is arranged to perform a polarization based splitting to provide first and second intermediate sets of signals 102 and 112.

The first and second sets of signals 108 and 109 originate from the first intermediate set of signals 102.

The third and fourth sets of signals 118 and 119 originate from the second intermediate set of signals 112.

The first and second intermediate sets of signals 102 and 112 differ from each other by their polarization. Their polarizations may be orthogonal to each other and may be referred to as X-polarization (X-POL) and Y-polarization (Y-POL) although other polarizations may be provided.

The coupler 25 is arranged to receive the second and fourth sets of signals 109 and 119 and to generate a fifth set of signals 110. The polarization direction of the fifth set of signals differs from a polarization direction of the first and second intermediate sets of signals. For example, it may be non-orthogonal to each one of the polarization directions of the first and second intermediate sets of signals 102 and 112. For example, it may be oriented to the X-axis and the Y-axis. It is expected that it is substantially oriented—at least ten degrees from each of the X-axis and the Y-axis and me be about 45 degrees oriented to these axes.

The detection module 67 is arranged to generate first, second and third sets of detection signals 121, 122 and 123 in response to the first, third and fifth sets of signals 108, 109, 118 and 119.

The reconstruction module 67 is arranged to reconstruct the first polarization modulated information and the second polarization modulated information to provide reconstructed first and second polarization modulated information 141 and 142, the reconstruction is response to the first, second and third sets of detection signals 121, 122 and 123.

The mixed signal processor 60 converts the first, second and third detection signals 121, 122 and 123 that are analog signals to digital signals that include first, second and third digital sets of detection signals 131, 132 and 133 respectively.

The digital signal processor 70 calculates the reconstructed first and second polarization modulated information 141 and 142 from the first, second and third digital sets of detection signals 131, 132 and 133.

FIG. 1A illustrates the coupler 25 as being a dual input and dual output coupler although coupler with different number of input and/or output ports can be provided. reconstruction module 67

The coupler 25 includes a first input 251, a second input 252 and at least one output such as first and second outputs 253 and 254. The first input 251 receives the second set of signals 109, the second input 251 is arranged to receive the fourth set of signals 119. The first output 253 outputs signals that represent sums of signals of the second and fourth sets of signals. The second output 254 outputs signals that represent differences between the signals of the second and fourth sets of signals. The signals outputted from outputs 253 and 254 form the fifth set of signals 110.

The fifth set of signals 110 is fed to the third detection circuit 50. Signals from first output 253 are provided to third photodiode 51. Signals from second output 254 are provided to fourth photodiode 52. The third and fourth photodiodes 51 and 52 may form a balanced pair of photodiodes. The balanced pair of photodiodes outputs signals to a third amplifier such as TIA 54 that outputs the third set of detection signals 123.

The first set of signals 108 is fed to the first detection circuit 30. FIG. 1A illustrates that these signals are fed to first photodiode 31 that outputs signals to a first amplifier such as TIA 32 that outputs the first set of detection signals 121.

The second set of signals 108 is fed to the second detection circuit 40. FIG. 1A illustrates that these signals are fed to second photodiode 41 that outputs signals to a second amplifier such as TIA 42 that outputs the second set of detection signals 121.

The ONU may be a laserless ONU—it does not include a laser. FIG. 1A illustrates that portion 10 does not include a laser.

According to an embodiment of the invention the ONU may include transmission circuitry. Any known transmission circuitry may be used—laserless or laser including transmission circuitry may be provided. A non-limiting example of a laserless transmission circuitry is provided in FIGS. 1B-1C that illustrates transmission circuitry that modulates downstream signals with upstream information to provide upstream signals.

Figure 1B:
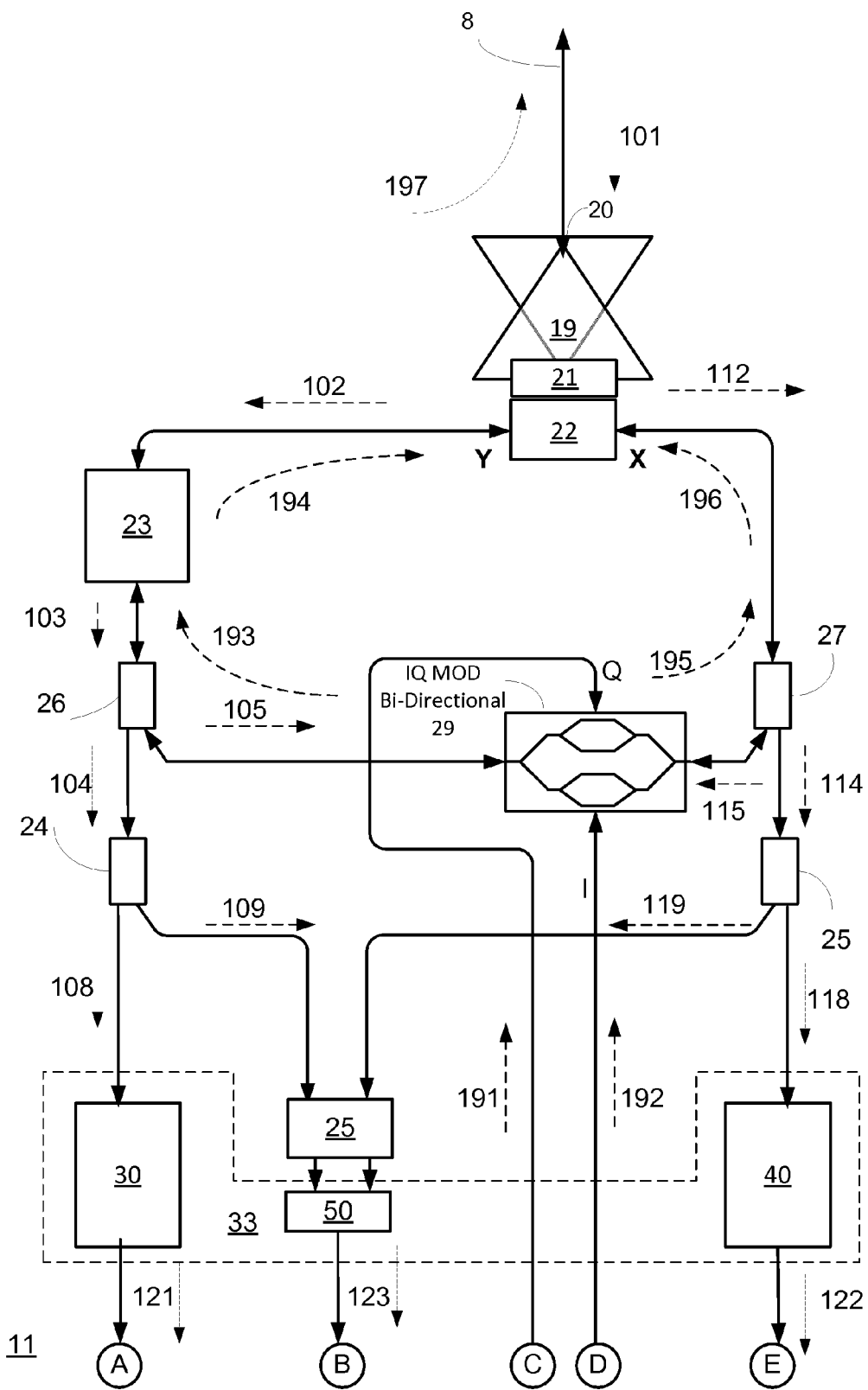
FIGS. 1B-1C illustrate two portions of an Optical Network Units (ONU) according to an embodiment of the invention.
Figure 1C:
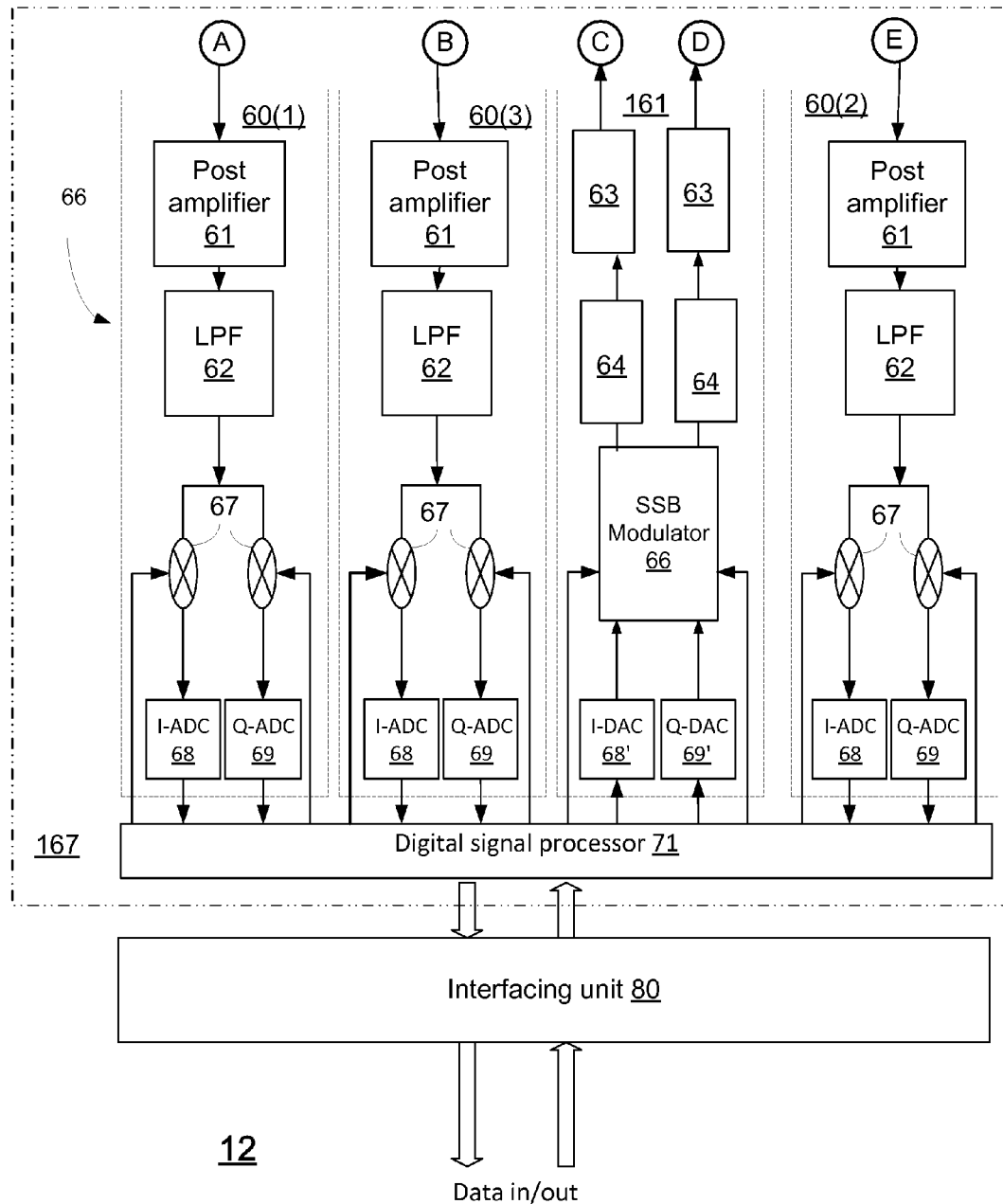

FIGS. 1B-1C illustrates portions 11 and 12 of an ONU according to an embodiment of the invention. Portions 11 and 12 are coupled to each other at points A, B, C, D and E. The ONU may include additional portions and/or components.

Portions 11 and 12 include the following components:
a. Port 20.

b. Bi-directional optical amplifier such as semiconductor optical amplifier (SOA) 19.
c. Bandpass filter (BPF) 21.
d. A polarization module that may include polarization based splitter (BPS) 22, power splitters 24 and 25 and power splitters 26 and 27.
e. Polarization rotator 23.
f. Polarization changing circuit such as coupler 25.
g. A modulator such as IQ bi-directional modulator 28.
h. Detection module 33 that may include first, second and third detection circuits 30, 50 and 50.
i. Transmit and reconstruction module 167 that may include mixed signal circuits 66 and a digital signal processor 71.

FIG. 1 also illustrates the following signals:
101 Downstream signals (including pilot signal and downstream information signals).
102 First intermediate set of signals.
103 Polarization rotated intermediate set of signals.
104 Third intermediate set of signals.
105 Fourth intermediate set of signals.
108 First set of signals.
109 Second set of signals.
110 Fifth set of signals.
112 Second intermediate set of signals.
114 Fifth intermediate set of signals.
115 Sixth intermediate set of signals.
118 Third set of signals.
119 Fourth set of signals.
121 First set of detection signals.
122 Second set of detection signals.
123 Third set of detection signals.
131 First digital set of detection signals.
132 Second digital set of detection signals.
133 Third digital set of detection signals.
141 Reconstructed first polarization modulated information.
142 Reconstructed second polarization modulated information.
191 Q modulation control signals.
192 I modulation control signals.
193 First set of modulated upstream signals.
194 Polarization rotated set of modulated upstream signals.
195 Second set of modulated upstream signals.
196 Third set of modulated upstream signals.

The bandpass filter 21 may be very wide—it will enable the passage of downstream signals of any frequency that is being used by an OLT. In this sense the ONU is colorless—different ONUs that are allocated different frequencies may use the same bandpass filter 21. The bandpass filter 21 may be used to reduce the overall noise by reducing the bandwidth of the ONU.

The port 20 is arranged to receive downstream signals 101 that includes a pilot signal and downstream information signals. The downstream information signals embed first polarization modulated information and second polarization modulated information. The pilot signal is received at a pilot frequency slot and the downstream information signals are received at a downstream information frequency slot that differs from the pilot frequency slot. See, for example pilot frequency slots (P slots) and downstream information frequency slots (D slots) of FIGS. 5, 6 and 7A. The port 20 is also used for transmitting upstream signals 197.

The splitting module 29 is arranged to split the downstream signals to first, second, third and fourth sets of signals 108, 109, 118 and 119 and to fourth and sixth intermediate sets of signals 105 and 115.

The splitting module 29 includes polarization based splitter 22 that is arranged to perform a polarization based splitting to provide first and second intermediate sets of signals 102 and 112.

The first and second sets of signals 108 and 109 and the fourth intermediate set of signals 105 originate from the first intermediate set of signals 102.

The third and fourth sets of signals 118 and 119 and the sixth intermediate set of signals 115 originate from the second intermediate set of signals 112.

The first and second intermediate sets of signals 102 and 112 differ from each other by their polarization. Their polarizations may be orthogonal to each other and may be referred to as X-polarization (X-POL) and Y-polarization (Y-POL) although other polarizations may be provided.

It is noted that FIG. 1B illustrates additional sets of signals generated by the splitting module—and they include third intermediate set of signals 104 and fifth intermediate set of signals 114.

Power splitter 26 splits the polarization rotated set of signals 103 to provide the third and fourth intermediate sets of signals 104 and 105.

Power splitter 24 splits the third intermediate set of signals 104 to provide the first and second sets of signals 108 and 109.

Power splitter 27 splits the polarization rotated set of signals 113 to provide the fifth and sixth intermediate sets of signals 114 and 115.

Power splitter 25 splits the fifth intermediate set of signals 114 to provide the third and fourth sets of signals 118 and 119.

The coupler 25 is arranged to receive the second and fourth sets of signals 109 and 119 and to generate a fifth set of signals 110. The polarization direction of the fifth set of signals differs from a polarization direction of the first and second intermediate sets of signals. For example, it may be non-orthogonal to each one of the polarization directions of the first and second intermediate sets of signals 102 and 112. For example, it may be oriented to the X-axis and the Y-axis. It is expected that it is substantially oriented—at least ten degrees from each of the X-axis and the Y-axis and me be about 45 degrees oriented to these axes.

The detection module 33 is arranged to generate first, second and third sets of detection signals 121, 122 and 123 in response to the first, third and fifth sets of signals 108, 109, 118 and 119.

The transmit and reconstruction module 167 includes mixed signals circuits 66 that include reception paths circuits 60(1), 60(2) and 60(3), transmission path circuit 161. It also includes digital signal processor 71.

The reception paths circuits are arranged to reconstruct the first polarization modulated information and the second polarization modulated information to provide reconstructed first and second polarization modulated information 141 and 142, the reconstruction is response to the first, second and third sets of detection signals 121, 122 and 123.

The reception paths circuits 60(1), 60(2) and 60(3) are arranged to converts the first, second and third detection signals 121, 122 and 123 that are analog signals to digital signals that include first, second and third digital sets of detection signals 131, 132 and 133 respectively.

The digital signal processor 71 is arranged to calculate the reconstructed first and second polarization modulated information 141 and 142 from the first, second and third digital sets of detection signals 131, 132 and 133. It is also arranged to generate information signals to be upstream transmitted such as Q and I modulation control signals 191 and 192.

The generation and transmission of upstream signals includes using dedicated transmission circuits (such as modulator 28, transmission path circuit 160) as well as components that are also used for reception (such as beam splitters 26 and 27, PBS 22, polarization rotator 23 and digital signal processor 71).

The digital signal processor generated in-phase and quadrature phase (I and Q) digital signals that are converted, by transmission path circuit 160 to analog signals such as Q modulation control signals 191 and I modulation control signals 192.

The transmission path circuit 160 of FIG. 1C is illustrated as including I and Q digital to analog converters that include, for example, I-DAC and Q-DAC 68' and 69', SSB modulator 66, and various amplifiers such as variable gain amplifiers 64 followed by div amplifiers 63. Div amplifiers 63 output Q modulation control signals 191 and I modulation control signals 192.

Q modulation control signals 191 and I modulation control signals 192 are fed to modulating inputs of modulator 28 and are used to modulate downstream sets of signals such as fourth and sixth intermediate sets of signals 105 and 115 to provide first set of modulated upstream signals 193 and second set of modulated upstream signals 195. The first set of modulated upstream signals 193 passes through power splitter 26, and has its polarization altered by polarization rotator 23 to provide polarization rotated set of modulated upstream signals 194.

The second set of modulated upstream signals 195 passes though power splitter 27 to provide the third set of modulated upstream signals 196.

The polarization rotated set of modulated upstream signals 194 and the third set of modulated upstream signals 196 are added to each other by PBS 22, filtered by BPS 21, and amplified by SOA 19 to provide upstream signals 197.

The ONU may be coupled to a downstream devices and/or networks via interfacing unit 80.

Figure 2A:
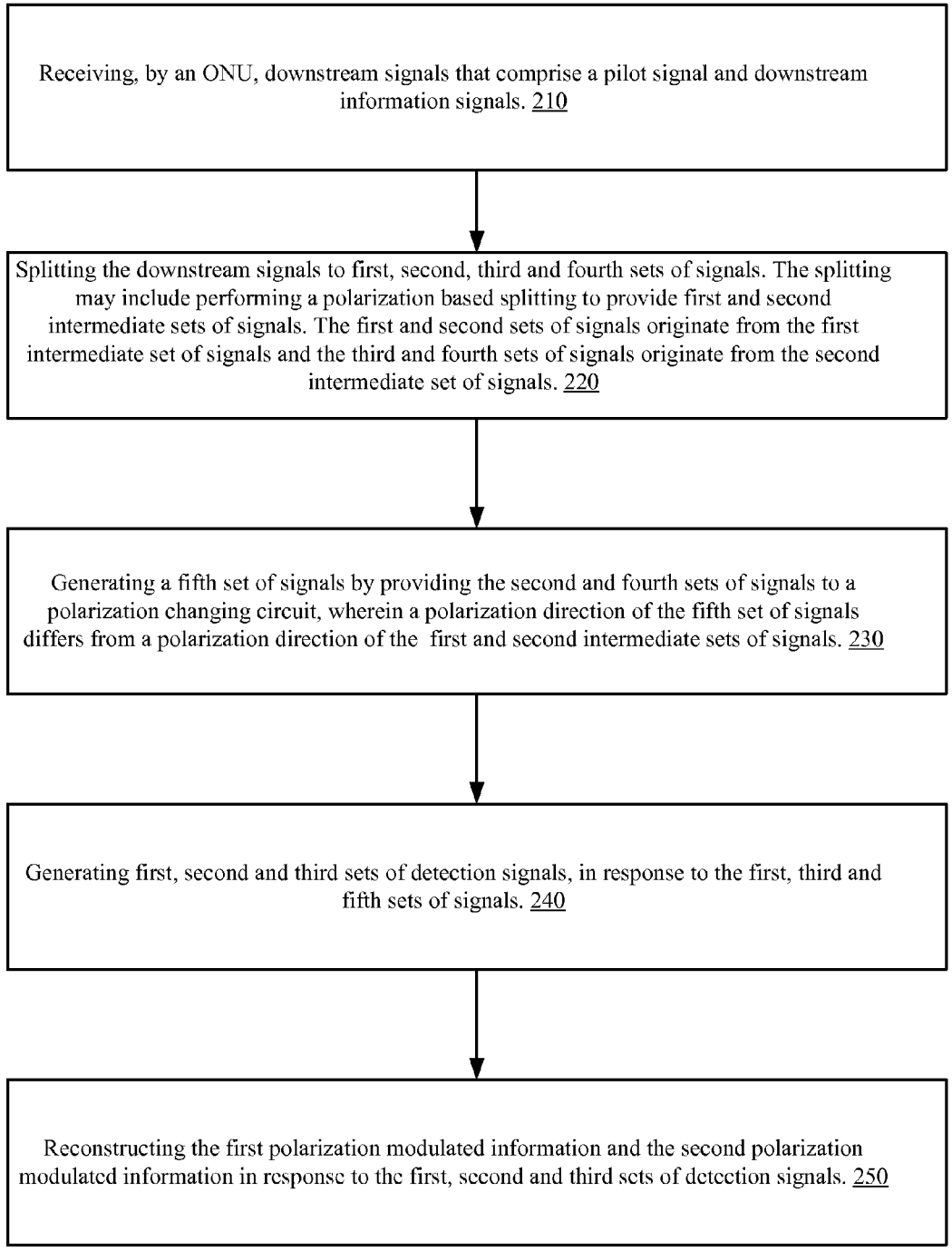
FIG. 2A is a flow chart of a method according to an embodiment of the invention.

FIG. 2A illustrates method 200 according to an embodiment of the invention.

Method 200 may start by stage 210 of receiving, by an ONU, downstream signals that comprise a pilot signal and downstream information signals.

The downstream information signals embed first polarization modulated information and second polarization modulated information.

The pilot signal is received at a pilot frequency slot and the downstream information signals are received at a downstream information frequency slot that differs from the pilot frequency slot.

Stage 210 may be followed by stage 220 of splitting the downstream signals to first, second, third and fourth sets of signals. The splitting may include performing a polarization based splitting to provide first and second intermediate sets of signals. The first and second sets of signals originate from the first intermediate set of signals and the third and fourth sets of signals originate from the second intermediate set of signals.

Stage 220 may be followed by stage 230 of generating a fifth set of signals by providing the second and fourth sets of signals to a polarization changing circuit, wherein a polarization direction of the fifth set of signals differs from a polarization direction of the first and second intermediate sets of signals.

The polarization changing circuit may be a coupler. Stage 230 may include providing the second set of signals to a first input of the coupler, providing the fourth set of signals to a second input of the coupler; and outputting the fifth set of signals by at least one output of the coupler.

The third sets of detection signals may represent (a) a set of sums of signals of the second and fourth sets of signals, and (b) a set of differences between the signals of the second and fourth sets of signals.

Stage 230 may be followed by stage 240 of generating first, second and third sets of detection signals, in response to the first, third and fifth sets of signals. It is noted that the first and second detection signals may generated after stage 220.

Stage 240 may include generating of the first, second and third sets of detection signals by first, second and third detection circuits respectively.

Stage 240 may be followed by stage 250 of reconstructing the first polarization modulated information and the second polarization modulated information in response to the first, second and third sets of detection signals.

Figure 2B:
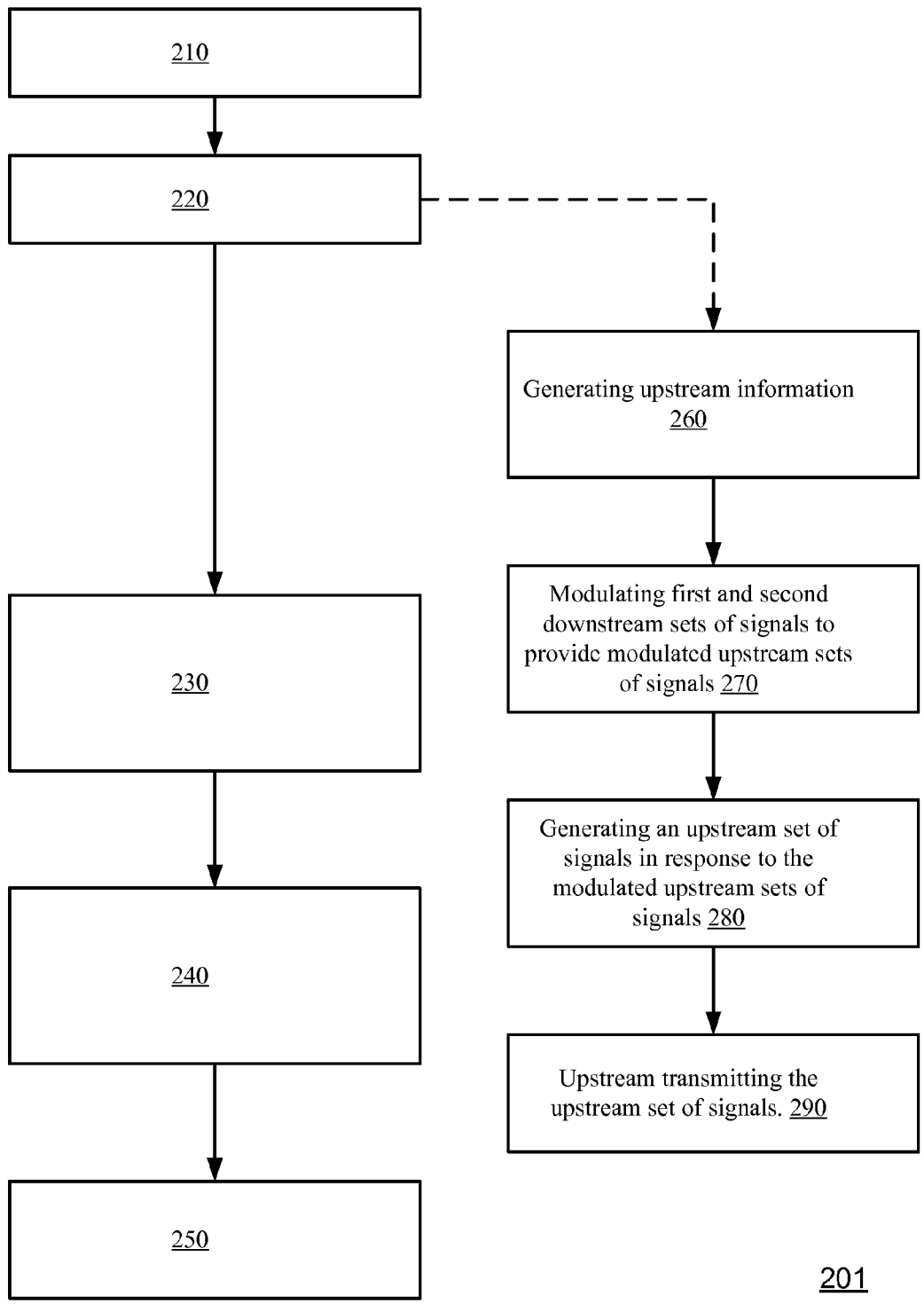
FIG. 2B is a flow chart of a method according to an embodiment of the invention.

FIG. 2B illustrates method 201 according to an embodiment of the invention.

Method 201 differs from method 200 by including additional stages (in addition to stage 210, 220, 230, 240 and 250) such as stages 260, 270, 280 and 290.

Stage 260 may include generating upstream information (see for example Q modulation control signals and 192 of FIG. 1C). Stage 260 may follow stage 230.

Stage 260 may be followed by stage 270 of modulating first and second downstream sets of signals (such as sets of signals 105 and 115 of FIG. 1C) to provide modulated upstream sets of signals such as first and second sets of modulated upstream signals 193 and 195. The first and second downstream sets of signals are modulated with the upstream information (see for example Q modulation control signals and 192 of FIG. 1C).

The first downstream set of signals 105 originates from the first intermediate set of signals 102 and the second downstream set of signals 115 originate from the second intermediate set of signals 112.

Stage 270 may be followed by stage 280 of generating an upstream set of signals (197) in response to the modulated upstream sets of signals such as first and second sets of modulated upstream signals 193 and 195. This may include rotation of polarization (by polarization rotator 23), passing through power splitters 26 and 27, combining by BPS 22 and filtering by bandpass filter 21.

Stage 280 may be followed by stage 290 of upstream transmitting the upstream set of signals.

Figure 5:
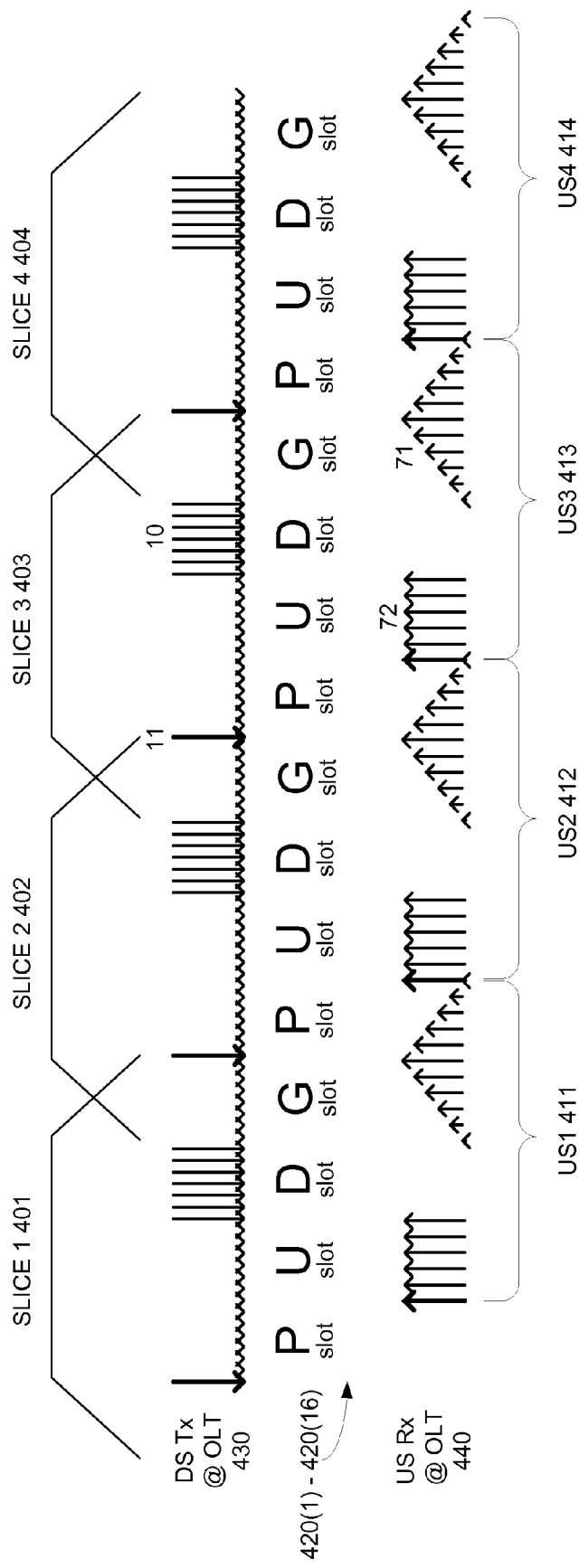
Figure 7A:
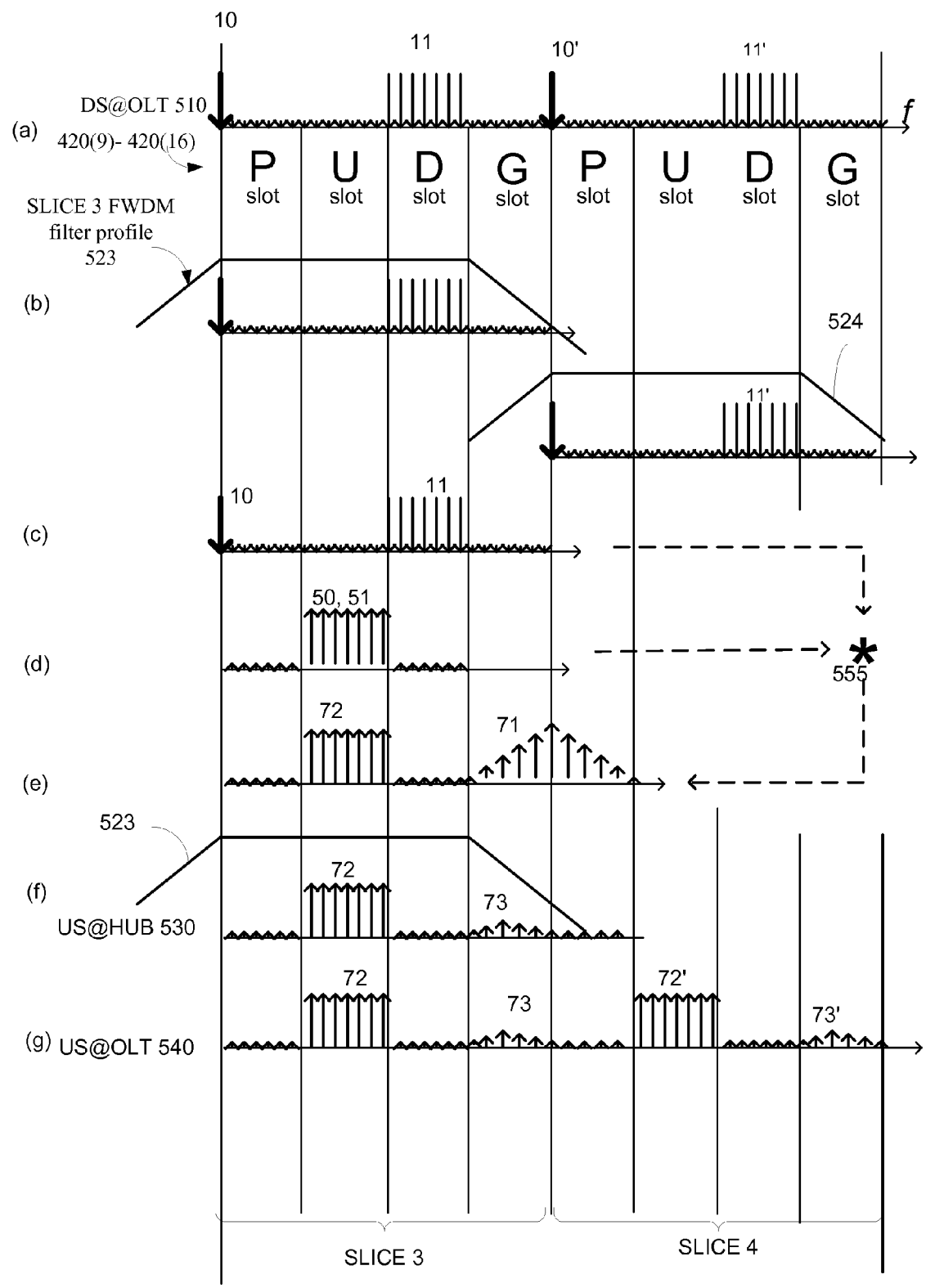

The upstream information signals may be transmitted at an upstream information frequency slot that differs from the downstream information frequency slot and from the pilot frequency slot (see, for example, U slots of FIGS. 5, 6 and 7A). The pilot frequency slot, the downstream information frequency slot, and the upstream information frequency slot have a same bandwidth (Wslot).

Optical Access Network Frequency Allocation and Structure

Figure 3:
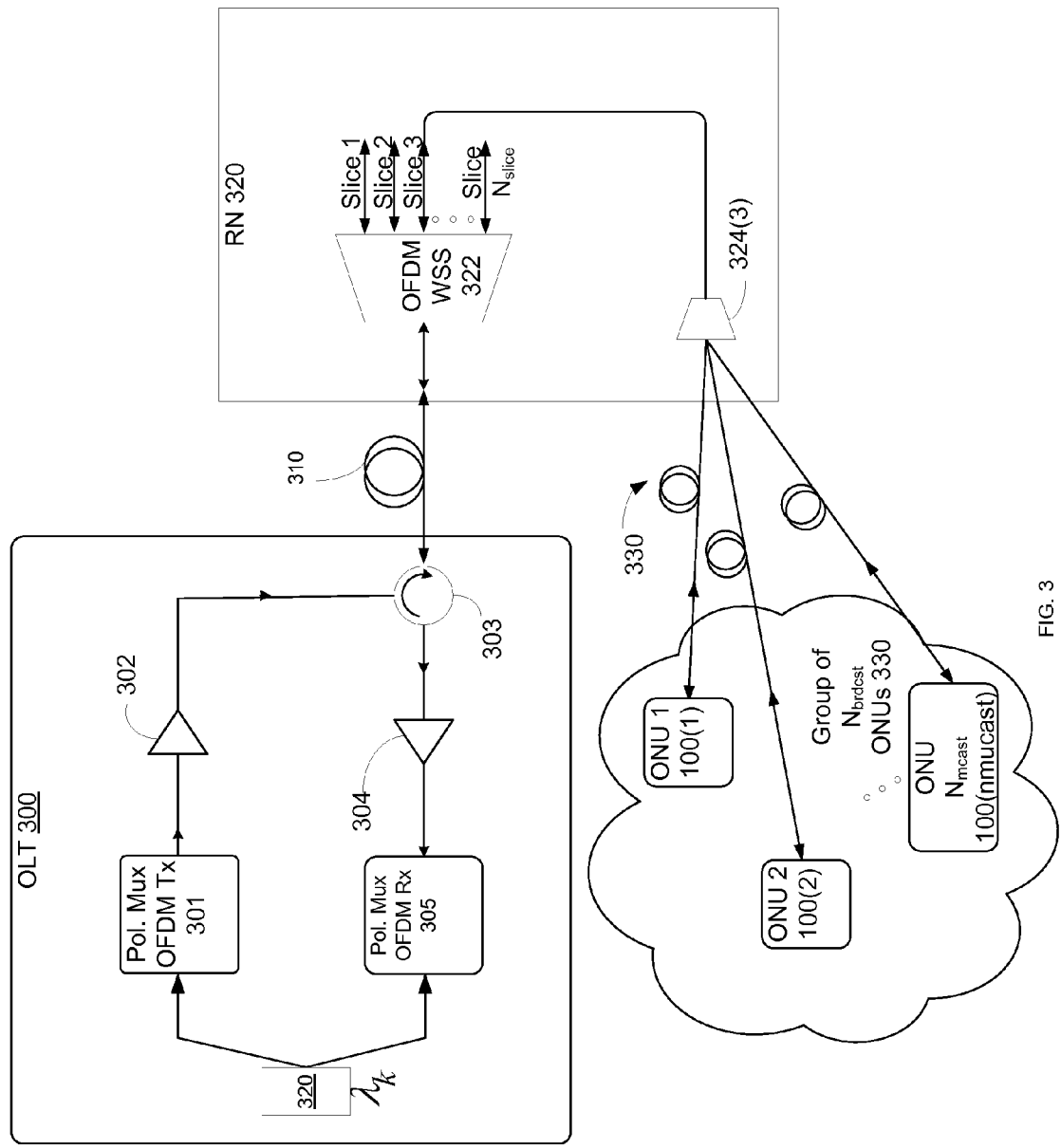
FIGS. 3, 4 and 7B illustrate optical access networks according to various embodiments of the invention.

FIG. 3 illustrates an OLT having a laser diode 320 having a wavelength of LambdaK that is coupled to a TX OFDM transmitter 301, to an amplifier 302 and via a circulator 303 to a fiber that is connected to a remote node 320. The OLT has a receiver path that starts by circulator 303, is followed by amplifier 304 and ends by OFDM receiver 305. Each OFDM channel is further composed of sub-channels (referred to as tones), and subsets of these tones serve one or more ONUs. A Fractional Wavelength Division (de)Multiplexer (FWDM 322) is inserted in the downstream path of each OFDM channel at the remote node RN 320, splitting the OFDM signal of each wavelength into Nslice frequency slices and multicasting each slice to a specific group of Nmcast ONUs—such as group 330 that includes ONUs 100(1)-100(Nmcast). Passive splitting is done by means of passive splitters (such as splitter 324(3) that receives the third frequency slice allocated to group 330 and splits it to each ONU of group 330. Each passive splitter is associated with a FWDM output port. The ONUs belonging to each such multicast group use FDM (different OFDM tones) and/or TDM for the DS reception, as elaborated below, picking up a subset of the throughput on the particular slice. Thus, a key feature is the usage of two levels of splitting for each DWDM channel, the first level being orthogonal spectral splitting, typically incurring a fixed excess loss which does not depend on the split ratio (=Nslice), and the second level being passive splitting, incurring an inherent loss of 1:Nmcast in addition to its excess loss.

Compared to alternative approaches, whereby each ONU listens to a full wavelength channel OFDM multiplex, the partitioning into spectral slices yields substantial advantages, in addition to the OSNR advantage due to the reduction in power splitting loss by a factor up to Nslice. A factor of up to Nslice OSNR improvement would then be attained for an ideal FWDM (e.g. for Nslice=4, OSNR would be improved by 6 dB). More generally, most of the opto-electronic electrical bandwidth requirements at the ONU are reduced due to the spectral width reduction.

FIG. 3 illustrates a single wavelength signal path. Signal is split in two hierarchical levels—the first level done by a FWDM component, being orthogonal spectral splitting, typically incurring a fixed excess loss which does not depend on the split ratio, and the second level being passive power split, incurring an inherent loss of 1:Nmcast in addition to its excess loss.

Figure 4:
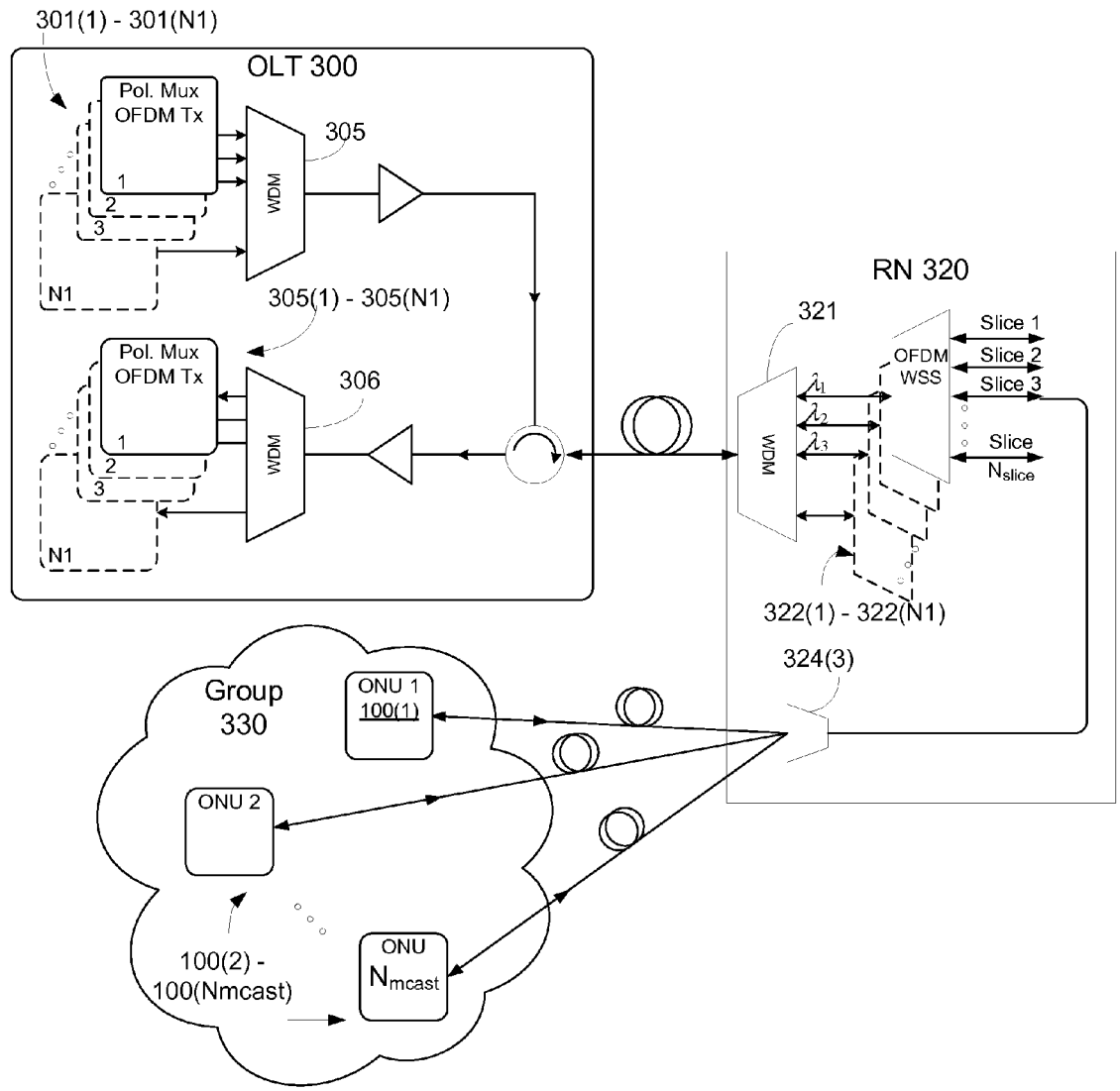

Although FIG. 3 describes a single wavelength system, it is noted that wavelength division multiplexing may be used as the top level of spectral multiplexing, for large serving areas. As shown in FIG. 4, each OFDM signal has a specific wavelength, LambdaK, on a ITU-T compatible frequency grid, currently selected at 25 GHz spacing (to correspond to electronic processing speeds commercially available at reasonable cost, as required for PON applications, especially the analog-to-digital conversion). Corresponding pairs of Tx and Rx components of the OLT (labeled by the same index, 301(1)-305(1), . . . 301(N1)-305(N1) may share the same optical source, used both as a source of DS modulation and as optical local oscillator for coherent detection.

The OFDM DS spectrum of a generic OLT Tx at a particular wavelength, is not contiguous but includes multiple guard-bands as well as pilot tones, to be used by ONUs for US modulation. As shown in FIG. 5, both the DS and US spectra are first partitioned into slices 401-404, and each slice is further partitioned into frequency slots 420(1)-420(16). There are three active frequency slots marked P (Pilot), U (Upstream) and D (Downstream) in each slice, as well as a G (Guard) frequency slot separating the PUD frequency slots of adjacent slices, and allowing the adjacent filters transition. The "PUDG" structure repeats itself Nslice times over each wavelength spectral span. The OLT transmits DS data (OFDM sub-carriers) over the D-frequency slot and a pilot tone at the left edge of the P frequency slot. Hence the P frequency slot carries a single unmodulated tone, and the U and G frequency slots are empty. The channel slices are extracted by the FWDM to individual output ports, with the tones from the adjacent slices being suppressed by the FWDM slicer shape. Each spectral slice output is associated with an ONU multicast group.

The spectral width of the guard-band G may be is actually arbitrary, though for definiteness, starting with FIG. 5, we took it equal to the widths of P, U and D frequency slots. We shall denote the spectral width of the P, U and D frequency slots by Wslot and the width of the G frequency slot by α Wslot with the G frequency slot relative width α to be determined by the FWDM filter design—how steep can the filter stop-band can be made. Notice that α=1 is a reasonable assumption, used in the following figures.

FIG. 5 also illustrates aggregate US spectral structure from all the ONUs—arranged in frequency shifted upstream slices US1-US4 411-414. It is apparent that the upstream information signals (such as 72) are transmitted upstream by the ONU over the U frequency slot of the corresponding slice to which the ONU is connected. Extraneous upstream modulation (Upstream secondary signals) is also generated over the G and P frequency slots, however (consider for definiteness the G frequency slot separating slices 1 and 2) the extraneous upstream modulation going over the P frequency slot is very strongly attenuated by slice-1 filter and preventing interference to the adjacent slice 2, whereas the upstream modulation over the G frequency slot is just partially attenuated by either slice 1 or slice 2 filters, yet it falls in a spectral region not interfering with the PUD operations in these adjacent slices. FIGS. 6 and 7A explain how the US modulation (shown at the bottom of FIG. 6) is actually generated at each of the ONUs. To this end let us recall the novel ONU structure as illustrated in a block diagram in FIG. 1A.

The top row of FIG. 5 indicates the frequency responses from the FWDM WSS 322 input to each of its output ports—it shows the different frequency slices 401-404. The second row describes the sparse wideband OFDM signal transmitted DS by the OLT 300—a pilot signals (such as 11) and downstream information signals (such as 10)—aimed to four different groups of ONUs. The 3rd row describes the "PUDG" structure of frequency slots 420(1)-420(16), with the OFDM spectrum divided into frequency slots. The bottom row describes the US spectrum received at the OLT arranged in frequency shifted upstream slices US1-US4 411-414, generated by the superposition of the multiple re-modulations performed by the ONUs upon the DS signal received at each ONU.

FIG. 6 illustrates in greater details one slice and provides a graphic illustration of the generation of the spectral structure for upstream modulation. A frequency slice 403 includes four frequency slots 420(9)-420(12), the downstream signals 430 include a pilot signal 11 and downstream information signals 10. The upstream signals include upstream information signals 72 and upstream secondary signals 71.

ONU and OLT Bandwidth Requirements

The overriding objective is to generate a very efficient, high-performance, yet low cost design. While our emphasis is on the low-cost mass-produced ONU, we should not lose track of the OLT, which may be a bit more relaxed in terms of cost, as it is shared among multiple ONUs. The spectral design, described in FIGS. 5 and 6 was formulated in abstract terms.

The suggested architecture enables of low bandwidth ONUs, facilitating low-cost electronics and electro-optic modulation. We recall that this is made possible by the usage of frequency selective optical designs for the FWDM filter banks. We show below that the ONU bandwidth, as far as reception is concerned, is brought down to Wslot, whereas in the upstream transmission, due to the requirement to avoid re-modulation over the same D frequency range, we must shift the U-frequency slot one frequency slot to the right, i.e. for US modulation we require the DAC to support a doubled bandwidth of 2Wslot. This will be reflected in the bandwidth requirements for the DAC in the ONU, and the electro-optic IQ modulator, which should extend to 2Wslot. Notice however that it suffices to optimize the DAC and IQ MOD and just over a band pass span [Wslot,2 Wslot], providing relatively flat frequency performance over this passband range, rather than requiring flatness over the full baseband [0,2 Wslot] range. At this point let us develop a methodology for deriving numerical values for the key parameters to be given in this example.

Exemplary Design Scenario

First we select a WDM spacing. A natural choice would be the 50 GHz ITU-T grid; out of the 50 GHz band associated with each "wavelength" some 40 GHz are usable for PON US and DS modulation, however an OFDM OLT Rx taking full advantage of this band would require an oversampling rate of about 1.4, i.e. ADCs at 40·1.4=56 Gsamp/s, which is precisely the ADC technology we would like to avoid (sampling rate is too high), as it barely starting to be introduced now. Instead we opt for halving the OLT Rx ADC speed, operating at 56/2=28 Gsamp/s, which is considered a low-cost CMOS technology (the same ADC devices will be down-graded to 20 or 10 Gsamp/sec in the ONU, which will still provide some nice oversampling advantages, trading those against power consumption, while the CMOS ASIC meets the very low-cost ONU requirements). Now, as we halved the sampling rate at the OLT, we have also halved the bandwidth, hence now two OFDM DS signals fit in the 50 GHz band (with substantial guard band margin at the two ends). A more natural choice of WDM grid is the 25 GHz spacing, also conforming to the ITU-T standard. It is possible to generate such an optical comb of lines spaced 25 GHz apart by various means, e.g. by commercially available modelocked lasers, or other type of multi-carrier generators fed from a stable laser source.

The 25 GHz WDM grid, with each wavelength modulated by the IQ signals from the two polarizations of a particular OFDM DS Tx, is wavelength multiplexed by a WDM (which may also be realized by a FWDM), and transmitted from the OLT, downstream to the remote node, where it is WDM de-multiplexed, then each 25 GHz OFDM frequency band, riding on a particular wavelength, is sliced into Nslice spectral slices. Two reasonable selections for Nslice are Nslice=2 and Nslice=4. Considering first Nslice=2, there are two slices, over the 25 GHz span within each of which we place the PUDG spectral structure. In fact a convenient design directive is to ensure periodicity across slices and across the WDM grid, hence when Nslice=2, the frequency slots design per slice may be more precisely specified as G/2 P U D G/2, i.e. two concatenated frequency slots yield G/2 P U D G/2 G/2 P U D G/2=G/2 P U D G P U D G/2 and two concatenated $W_\lambda$=25 GHz bands yield Similarly, if we select $N_{slice}$=4, we obtain four slices that span over 25 Ghz WDM band:
G/2 P U D G/2 G/2 P U D G/2 G/2 P U D G/2 G/2 P U D G/2=G/2 P U D G P U D G P U D G P U D G/2

In each slice we have (wrapping around one of the two G/2 from one end to another, i.e. shifting the window by G/2), a PUDG pattern emerges, hence there are precisely four frequency slots per slice and we have the relations: Wslice=W$\lambda$/Nslice; Wslot=Wslice/4=W$\lambda$/(4Nslice).

For W$\lambda$=25 Ghz and Nslice=2, Wslot=25/(4*2)=3.125 Ghz.

For W$\lambda$=25 Ghz and Nslice=4, Wslot=25/(4*4)=1.5625 Ghz.

The pro and con considerations for these two selections boil down to the trade-off between the challenges of FWDM optical filtering in the remote node vs. the challenge of high-speed Silicon photonics based electro-optic IQ modulation in the ONU.

At this point, for the FWDM filter transition, separating adjacent slices Wslot=3.125 Ghz is currently an available technology, whereas 1.56125 Ghz is harder to achieve but may be developed over the course of the project.

On the other hand, the required modulator bandwidth is shown below to equal Wmod=2 Wslot (twice the bandwidth of the information, as frequency shifting of the U (and D) band up by one frequency slot is required to prevent backscatter as discussed below).

Thus, for Nslice=2 and Wslot=3.125 Ghz we require Wmod=2Wslot=6.25 Ghz,
whereas when Nslice=4 and Wslot=1.56 Ghz we require Wmod=2Wslot=3.125 Ghz.

Henceforth, when considering the description of the various system modules and components below, it is convenient to keep these two specific scenarios in mind: Wslot=3.15 or 1.56 Ghz.

Heretofore we nominally took the width of the P, U, D and G frequency slots to be identical, Wslot. However, depending on the FWDM filter technology, it may be possible to have a G frequency slot filter transition equal $\alpha$Wslot, with $\alpha$<1. In this case, the PUDG fitting in the slice implies that (3+$\alpha$) Wslot=Wslice, hence the calculation of Wslot is readily modified to read: Wslot=Wslice/[Nslice*(3+$\alpha$)].

Various Characteristics of the Multiplexing Format and Multiple Access

The multiple access scheme in the DS consists of OFDM with time-domain packet multiplexing. The ONUs belonging to each multicast group share and listen to a common DS OFDM signal (a slice of the wideband OLT DS OFDM signal), and TDM-extract their individual data-packets out of the overall shared DS OFDM signal.

Figure 8:
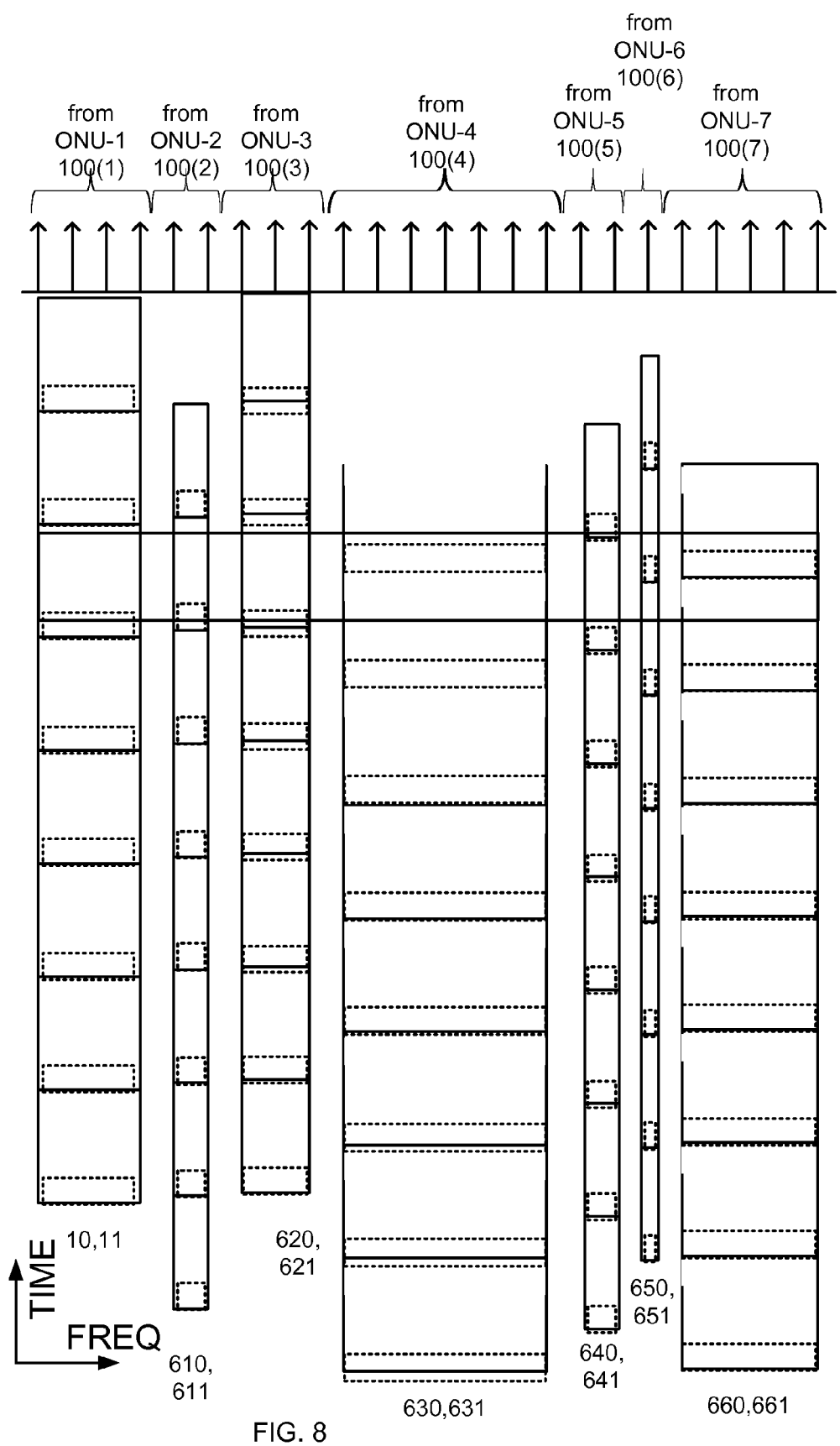

The novel multiple access scheme in the US consists of OFDM-based Frequency-Division Multiple Access (FDMA)—as illustrated in FIG. 8. FIG. 8 illustrates seven different ONUs 100 (1)-100(7), that transmit upstream information signals and upstream secondary signals (10,11), (610, 611), (620,621), (630,631), (640,641), (650,651) and (660, 661) at a different sub-set of tones and at slightly different timing (to compensate for differences in the propagation of signals over the PON).

The ONUs of each multicast group all transmit US OFDM signals occupying a common spectral slice, with each ONU accessing a disjoint subset of OFDM tones, while nulling the other tones (which are assigned to other ONUs). In other words, each ONU signals upstream on a subset of tones (OFDM subcarriers) disjoint from that of its neighbors (as assigned by the OLT). All the US OFDM signals generated by the individual ONUs are OFDM-block-time synchronized by a ranging protocol and are locked onto the common frequency-comb of the DS OFDM signal. This digital-OFDM-oriented FDMA approach avoids dealing with complex analog frequency shifting schemes for the various US ONU Tx. Moreover, all users are "on" all the time, hence there are no bursts and transient effects, and inefficiencies caused by TDMA collisions are eliminated While the strategy just described for the US multiple access addresses the frequency synchronization and time-blocks synchronization, we mention that phase synchronization is not an issue (simple channel estimation techniques and one-tap equalizers are used in the OFDM OLT Rx).

Our novel frequency-domain oriented multiple access approach should be contrasted with current generation GPON systems, currently based on Time-Division Multiplexing (TDM) Multicast in the DS, and Time-Division Multiple Access (TDMA) in the US, which decimates the throughput down to one-over-the-number of users, and requires overcoming time-domain transients (burst detection).

FIG. 7A illustrates the unique spectral design according to an embodiment of the invention.

PON Hierarchy. OLT comprises $N_\lambda$ OFDM DS Tx-s and US Rx-s each transmitting on a WDM 25 GHz band ("wavelength"). The Remote Node (RN or Remote HUB) WDM de-multiplexes the WDM-OFDM signal from the ONU. Each wavelength is input into a Fractional Wavelength Division Multiplexer (FWDM) multi-port filter, with Nslice outputs, dividing the 25 GHz OFDM spectrum into Nslice spectral slices. All the ONUs connected to the same power splitter are said to form a multicast group, sharing the same slice of the OFDM DS signal, and injecting and combining their US transmissions as further shown in FIG. 8.

FIG. 7A illustrates the spectral structure of the OFDM DS and US signals at various levels in the network, and in particular at the ONU modulator input and output. The different signals are labeled (a)-(g).

This figure exemplifies a design with Nslice=2 slices fitting in the 25 GHz WDM band, i.e. FWDM filters with one input and two outputs are connected in the HUB to each of the wavelength outputs of the WDM (the other design case, Nslice=4 is similarly structured with the PUDG frequency slots structure recurring four times).

The top row (a) illustrates an OLT the generates a wideband 25 GHz OFDM spectrum with two slices aimed at two ONU multicast groups. The sparse spectral structure is intended to make room for the US transmissions, ensuring that US and DS transmissions do not overlap and interfere (mitigate Rayleigh scattering cross-talk as well as US re-modulation of the DS information). This signal ("DSWOLT 510") includes a pilot signal 10 and downstream information signals 11 for a slice (such as third slice of FIG. 4 aimed to group 330 that includes ONU 100(1)), another pilot signal 10' and another downstream information signals 11 for another frequency slice (such as fourth slice of FIG. 4).

PUDG Frequency slots 420(9)-420(16) are also shown—as the OFDM spectrum is divided into frequency slots of equal width Wslot=25/(4Nslice)=25/8=3,125 Ghz. In the ONU, the US re-modulation is actually formed around pilot tones (labeled "pilot") injected at the OLT, one per slice.

The second row (b) illustrates that at the remote HUB 320, the FWDM partitions the spectrum into two slices, directed to different remote nodes. Each remote node, in turn, splits the lightwave signal to multiple ONUs, forming a multicast group:

a. Slice 3 FDWM filter profile 523 passes downstream signals within PUD frequency slots 420(9)-420(11)—pilot 10 and downstream information signals 11 and provides these signals to group 330.

b. Slice 4 FDWM filter profile 524 passes downstream signals within PUD frequency slots 420(13)-420(15)—other pilot 10' and other downstream information signals 11' and provides these signals to another group of ONUs (not shown).

The third till fifth rows (c)-(e) illustrates that ONU 100(1) receives light signals pilot 10 and downstream information signals 11 that are modulated (represented by symbol 555) by electrical signals such as upstream signals 50 and 51 (row (d)) to provide (row (e)) upstream information signals 72 that are within the upstream information frequency slot and upstream secondary signals 71 that are outside frequency slots 420(9)-420(11).

The upstream signals 50 and 51 may be OFDM US IQ SSB info signal of spectral support [0, Wslot], that are digitally shifted to the right by Wslot (within the OLT US Tx processor, and using a DAC), such that the modulation signal to be applied to the IQ modulator becomes a band-pass electrical signal (50, 51) with support [Wslot, 2Wslot].

Modulation (multiplication) in the time-domain, maps into convolution in the frequency-domain, yielding the spectrum of row (e). What matters is that the US info has been imparted in the D frequency slot, disjoint from the U frequency slot which carries the DS info. Moreover, the extraneous signal mixing the DS and US modulation (the "triangle") is suppressed (see row (f)) by the Slice 3 FDWM filter profile 523, and does not overlap with either the D or U useful information frequency slots. This is made possible by the unique spectral design shown in (a), including the pilot pilots, and by the band-pass digital shifting of the electrical US signal, as shown in (c).

Finally, row (g) depicts the US spectrum collected at the OLT, formed by the superposition of the two spectral slices US propagating through the FWDM hub.

A comparison of rows (a) and (g) shows that half the bandwidth is unused: just the D, U frequency slots are filled, whereas the P, G frequency slots are empty. However, the G frequency slots are necessary to allow FWDM filter stop-band transitions, whereas the P frequency slots, accommodating the pilot pilots, must be left empty, else their spectral content would be shifted into the D frequency slots upon ONU re-modulation. Despite the seeming 50% spectral inefficiency, the system is quite spectrally efficient after all, by virtue of the self-coherent detection, enabling detection of rich constellations Referring back to FIG. 8 it can be noted that:

(a): Individual ONUs of a particular multicast group (all connected to the same FWDM output port via a remote node), all transmit their modulations over disjoint subsets of tones of a common frequency comb spanning the U-frequency slot. In fact each of these ONUs generates a full OFDM comb, however each ONU sets to zero all tones used by the other ONUs in the multicast group, modulating just its own distinct subset of tones. The top row indicates the superposition of the US signals from all ONUs of the multicast group, the transmissions of which add up to a full OFDM spectrum. A variable number of ONUs may thus be supported within a multicast group, and different bandwidths (number of tones) may be allocated to different ONUs, as desired. In particular it is possible to assign all US tones in the multicast group to a single ONU, i.e. have Nmcast=4, with this ONU signaling US at the maximum possible bandwidth, taking up all tones over the Wslot spectral extent of the U-frequency slot within the slice. In addition, bandwidth may be assigned dynamically, varying in time according to user requests thus benefitting from statistical multiplexing.

(b): The OFDM time-domain blocks (frames) transmitted by each of the ONUs. All these blocks have duration T, but they may experience different timing phases from ONU to ONU, i.e. the instants between adjacent OFDM blocks of one ONU are misaligned with those of other ONUs, once received at the OLT. This would be undesirable, as all these subsets of tones are superposed in a composite OFDM signal to be processed by a single large size FFT (which also includes the tones from other slices). The method proposed to align the block boundaries of the US transmissions from all ONUs, is by means of a ranging algorithm as in the WiMax or DOCSIS standards (the usage of a small cyclic prefix (Reduced Guard Interval) allows relaxing the requirements of the ranging algorithm.

Network Hierarchy and Wavelength/Frequency Division Multiplexing

As seen in FIG. 7A the PON has a tree-like structure consisting of the OLT (WDM-OFDM), remote HUB (FWDM), Nodes (Passive splitting) layers. A new intermediate layer of denser DWDM is introduced at the remote hub based on Fractional Wavelength Division Multiplexers (FWDM), capable of extracting sub-wavelength spectral slices. The OFDM DS signal generated by each OLT Tx at a particular wavelength, comprises multiple spectral slices aimed at different multicast groups of ONUs. These spectral slices are directed to different fibers by the FWDM filters in the hub, each fiber leading to a passive splitter in the remote node. The fiber outputs of the passive splitter are directed to the ONUs of a particular multicast group. In the US direction, all the ONUs in a particular multicast group multiplex their transmissions in frequency within a US spectral frequency slot of their common spectral slice, interleaving non-overlapping subsets of OFDM tones, associated with each ONU US transmission.

Introducing the unique spectral structure of the transmitted DS and US signals the following principles are helpful to understand its rational:

(a) The US transmission in the ONU is also performed without a laser, based on US re-modulation of the DS received signal (the DS signal is "reflected" US, and re-modulated, with the US spectrum undergoing a frequency shift).

Figure 7B:
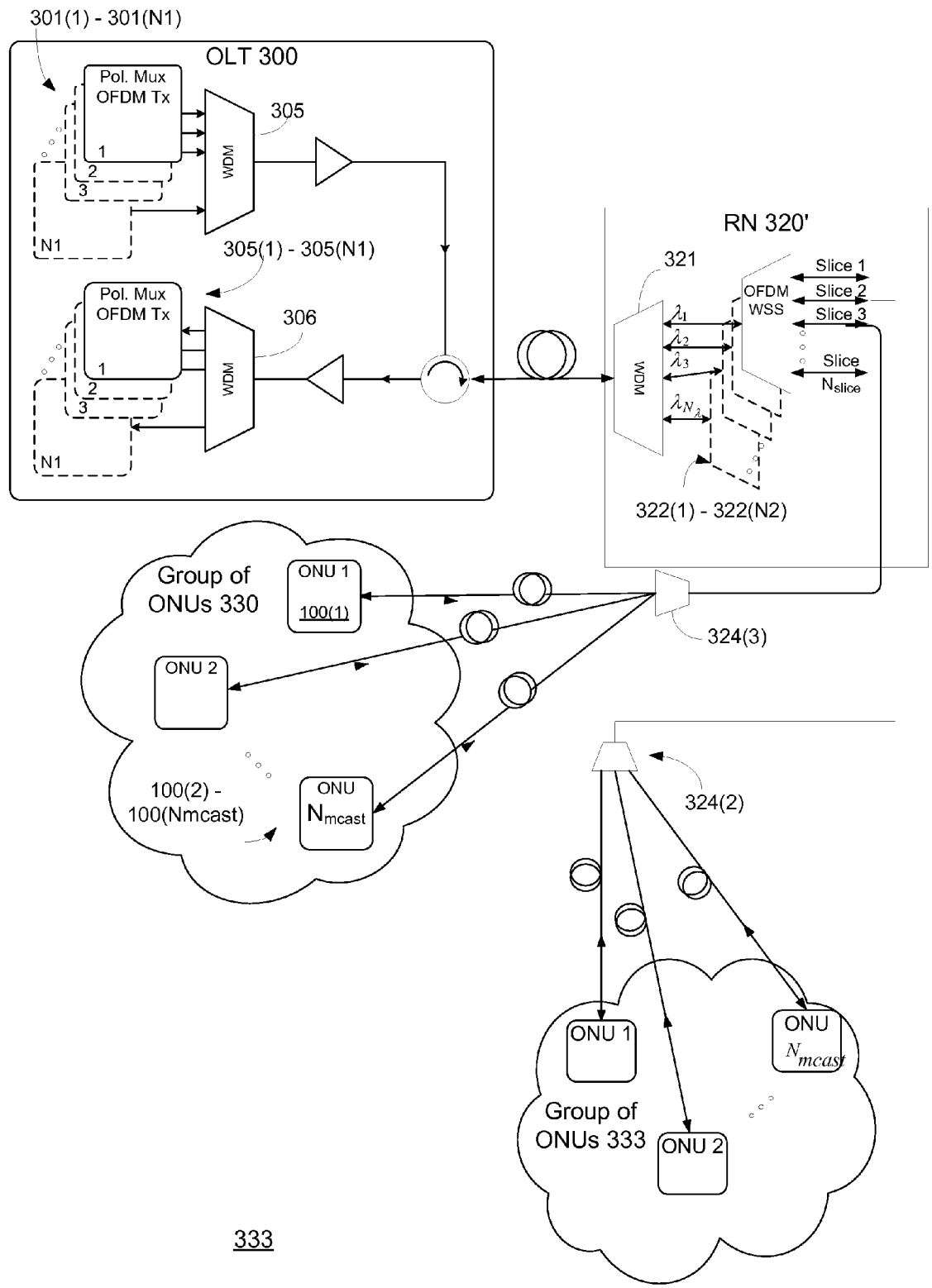

(b) A unique spectral design is illustrated in FIG. 7B throughout the network (OLT, remote HUB, ONU) enables decoupling the US re-modulation from the DS transmission (avoiding US re-modulation of the DS modulation, and mitigating Rayleigh backscatter cross-talk between the US and DS transmissions).

(c) The unique spectral design also achieves low overall detection bandwidth at the ONU, limiting the speed of the electronic detection and US re-modulation.

(d) The unique spectral design, bringing benefits (c), (d) above, consists of shaping the OFDM spectrum into spectral frequency slots including pilot pilots, limiting the optical detection bandwidth of the ONUs by means of a fractional wavelength division (de)multiplexer (FWDM) at the remote hub, and applying ONU US re-modulation with a digitally generated frequency shift.

(e) Consistent with the unique spectral design, the ONU is colorless, i.e. it includes no optical filtering. All ONUs are interchangeable.

(f) the DS pilot pilots and US re-modulation signal, are all digitally generated (analog pilot tones and analog mixers are eliminated), synthesizing all required frequency combs (and the complex amplitudes of the comb "teeth"—the subcarrier tones) in the OLT DS Tx and in the ONU US Tx, by means of IFFTs. In particular, the pilot tones implanted in the DS signal (required for decoupling the US re-modulation from the DS modulation), are simply generated as un-modulated sub-carriers in the OFDM comb.

(g) Analog (opto-)electronics bandwidth is minimized—The electro-optic modulation so speed (and the bandwidth of the DAC and analog modulator driver) in the ONU is kept low (either 3.125 GHz or 6.25 GHz under our two design scenarios illustrated in FIG. 7A with Nslice=2 or 4 respectively, inside a 25 GHz WDM grid, which is just a fraction of ¼ or ⅛ of the 25 GHz bandwidth of the full wavelength band). The effective optical detection bandwidth in the ONU is just 3.125 GHz (despite not having an on-board optical filter). One exception to minimizing the analog bandwidth, is the capability of using ADCs with oversampling (sampling rate of 20 Gsamp/sec, anti-aliasing filters (AAF) of 10 GHz) as implemented in the low-cost ONU Rx CMOS ASIC described above.

Theory of Operation

The ONU of FIGS. 1A-1C is analyzed, proving that it overcomes remote-LO fading. By abuse of notation we denote both continuous and discrete-time by the same letter, t. Here $d_{X/Y}(t)=\underline{d}_{X/Y}(t)e^{j(\omega_p+2\pi \cdot 1.5W)t}$ is the data complex-representation (analytic signal) of the band-pass optical field for the respective X and Y POL, and $p_{X/Y}(t)=\underline{p}_{X/Y}e^{j\omega_p t}$ is the remote LO (pilot tone) as received at the Rx FE. Here $\underline{d}_{X/Y}(t)$, $\underline{p}_{X/Y}$ denote the corresponding complex envelopes around an $\omega_p$ optical carrier (in particular $\underline{p}_{X/Y}$ is at DC, i.e., a complex constant, whereas $\underline{d}_{X/Y}(t)e^{j2\pi \cdot 1.5Wt}$ is a single-sideband (SSB) signal in the [W,2W] passband).

The received photo-currents are obtained by absolute-squaring the optical fields. We are interested just in the SSB mixing component thus we may drop the d×d and p×p terms (achieved by means of an electrical BPF), retaining just the p×d terms, yielding:

$$u_{SSB}(t)=|\underline{d}_X(t)+\underline{p}_X|_{SSB}^2 \propto Re\{\underline{d}_X(t)\underline{p}_X^* e^{j3\pi Wt}\}$$

$$v_{SSB}(t)=|\underline{d}_Y(t)+\underline{p}_Y|_{SSB}^2 \propto Re\{\underline{d}_Y(t)\underline{p}_Y^* e^{j3\pi Wt}\}$$

By IQ electrical detection (bandpass demodulation with cos and sin at the RF frequency W) we extract the full complex arguments of the Re{.} operators, yielding in the digital domain $$U_{SSB}[t]=\underline{p}_X^* \underline{d}_X; V_{SSB}[t]=\underline{p}_Y^* \underline{d}_Y \quad (1)$$

The remote-LO fading problem is now evident! We are unable to consistently detect both POL signals as either $\underline{p}_X$, $\underline{p}_Y$ may randomly fade away. Expressing the remote LO SOP as $[\underline{p}_X, \underline{p}_Y]=p_0[\cos\theta_p, e^{j\phi_p}\cos\theta_p]$, evidently whenever the value of the random variable $\theta_p \sim U[0,2\pi)$ approaches $\theta_p = \frac{1}{2}\pi k; k=0, 1, \ldots$ self-HET reception is severely degraded, as either $U_{SSB}[t]$ or $V_{SSB}[t]$ (nearly) vanish.

Now the solution to the problem: by adding the third path, we obtain a third redundant signal, expressible as a mixture of the two POL signals. Using the fact that the 3 dB coupler outputs may be written, up to a constant as $$\left(d_X e^{j3\pi Wt}+\underline{p}_X\right) \pm \left(d_Y e^{j3\pi Wt}+\underline{p}_Y\right):$$

$$w_{SSB}(t) \propto Re\left\{\left(d_X e^{j3\pi Wt}+\underline{p}_X\right)\left(d_Y e^{j3\pi Wt}+\underline{p}_Y\right)^*\right\}_{SSB} =$$
$$Re\{d_X \underline{p}_Y^* e^{j3\pi Wt}\} + Re\{d_Y \underline{p}_X^* e^{j3\pi Wt}\}$$

from which by electrical IQ demod we extract $$W_{SSB}[t]= \underline{p}_Y^* \underline{d}_X + \underline{p}_X^* \underline{d}_Y \quad (2)$$

The new signal of Eq. (2) now complements the two signals of Eq. (1) to provide a complete set of three projections of the desired data vector $d \equiv [\underline{d}_X, \underline{d}_Y]^T$ onto three (non-orthogonal though independent) axes, expressed in matrix form as, $R_{[3\times 1]}=P_{[3\times 2]}d_{[2\times 1]}$.

$$\underbrace{\begin{bmatrix} u \\ w \\ v \end{bmatrix}}_{R} = \underbrace{\begin{bmatrix} \underline{p}_X^* & 0 \\ \underline{p}_Y^* & \underline{p}_X^* \\ 0 & \underline{p}_Y^* \end{bmatrix}}_{P} \underbrace{\begin{bmatrix} d_X \\ d_Y \end{bmatrix}}_{d} \quad (3)$$

For any remote LO SOP the matrix P may be shown to have full column rank, this Eq. (3) is always invertible in terms of a Moore-Penrose pseudo-inverse (PI) matrix, $P_{[3\times 2]}^-$, satisfying $P_{[2\times 3]}^- P_{[3\times 2]}=1_{[2\times 2]}$. E.g. if $\phi_p=0$ then $$P_{[3\times2]}^- = \frac{8p_0^{-1}}{7+\cos[4\theta_p]} \cdot \begin{bmatrix} \cos & \sin^3\theta_p & -\cos\theta_p\sin^2\theta_p \\ -\cos^2\theta_p\sin\theta_p & \cos^3\theta_p & \sin\theta_p \end{bmatrix} \quad (4)$$

In our system it is not needed to explicitly estimate the PI matrix. The data-aided LMS algorithm does it for us by adaptively adjusting the 3×2 MIMO EQZ taps such that they effectively form the PI matrix, reconstructing an output vector, $\hat{d}=[\underline{d}_X, \underline{d}_Y]^T$ very close (in the mean-square sense) to the actual data-vector.

An intuitive sense why the third middle branch (the W-signal) resolves the remote-LO POL fading may be obtained by inspecting pathological special cases, such as $\underline{p}_Y=0$, in Eqs. (1), (2). In this case the X-branch peaks out, $U_{SSB}=p_0\underline{d}_X$, whereas the Y-branch completely fades out, $V_{SSB}=0$, but the new third branch (Eq. (2)) comes to the rescue, recovering the lost Y-data: $W_{SSB}=p_0\underline{d}_Y$. The role of the PI reconstruction matrix is now to route $U_{SSB}$ and $W_{SSB}$ to the respective $\underline{d}_X$, $\underline{d}_Y$ outputs, as may be readily verified from Eq. (4). In effect by using a non-orthogonal base (the three rows of the P-matrix) we generate redundancy, eliminating the fading of the remote LO for any SOP.

Numeric Simulations

The numeric simulations involved comparing a reference MISO polarization combining and 3×2 MIMO polarization de-multiplexing.

MISO Polarization Combining Reference System Performance

In this system the same signal is transmitted on both polarizations and the Rx applies an MRC MISO detector to recover the signal. The Tx SOP is the equivalent SOP of the sum of x and y pols at the Tx output.

The simulation results are listed Table I:

TABLE I

Polarization diversity MISO (MRC): Various conditions and performance

| Tx SOP Jones Vec | Tx x power [dBm] | Tx y power [dBm] | Rx Pilot PSD level | Rx signal PSD level | Symbol SNR x/y (after 1000 frames) | Symbol SNR x/y (after 3000 frames) |
|---|---|---|---|---|---|---|
| Cos(phi/4), Sin(phi/4) | 1.8 | 1.8 | −120 | −145 | 22.6/— | 24.5/— |
| Cos(phi/8), Sin(phi/8) | 4.1 | −3.5 | −117 | −145 | 23.6/— (24.4?) | |
| [1,0] | 4.8 | −60 | −116 | −142 | 25.3/— | |

Table I: Polarization Diversity MISO (MRC): Various Conditions and Performance

MIMO Polarization multiplexing with standard 2-way detector and 2×2 MIMO polarization de multiplexing receiver.

Two independent signals were transmitted on the two polarizations results are listed Table II:

TABLE II

Polarization diversity MISO (MRC): Various conditions and performance

| Tx SOP Jones Vec | Tx x power [dBm] | Tx y power [dBm] | Rx Pilot PSD level | Rx signal PSD level | Symbol SNR x/y (after 1000 frames) | Symbol SNR x/y (after 3000 frames) |
|---|---|---|---|---|---|---|
| Cos(phi/4), Sin(phi/4) | 1.8 | 1.8 | −120 | −147 | 22.5/22.1 | 22.5/22.0 |
| Cos(phi/8), Sin(phi/8) | 3.8 | −1.9 | −117 | −146 | 22.3/20.0 | 22.3/19.7 |
| [1,0] | 4.4 | −5.7 | −116 | −146 | ~9/9 | ~9/9 |

Table II: Polarization Diversity MISO (MRC): Various Conditions and Performance

MIMO Polarization multiplexing with the novel 3-way detector and 3×2 MIMO polarization de multiplexing receiver.

Two independent signals were transmitted on the two polarizations, results are listed Table III:

TABLE III

Polarization diversity MISO (MRC): Various conditions and performance

| Tx SOP Jones Vec | Tx x power [dBm] | Tx y power [dBm] | Rx Pilot PSD level | Rx signal PSD level | Symbol SNR x/y (after 1000 frames) | Symbol SNR x/y (after 3000 frames) |
|---|---|---|---|---|---|---|
| Cos(phi/4), Sin(phi/4) | 1.8 | 1.8 | −120 | −147 | 21.4/21.4 | 22.5/22.1 |
| Co s(phi/8), Sin(phi/8) | 3.8 | −2 | −117 | −146 | 22.3/20.1 | 22.6/20.6 |
| [1,0] | 4.4 | −5.7 | −116 | −146 | 20.1/20.1 | 21.3/21.2 |

Table III: Polarization Diversity MISO (MRC): Various Conditions and Performance While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An Optical Network Unit (ONU), comprising:
an port that is arranged to receive downstream signals that comprise a pilot signal and downstream information signals; wherein the downstream information signals embed first polarization modulated information and second polarization modulated information; wherein the pilot signal is received at a pilot frequency slot and the downstream information signals are received at a downstream information frequency slot that differs from the pilot frequency slot;
a splitting module that is arranged to split the downstream signals to first, second, third and fourth sets of signals; wherein the splitting module comprises a polarization based splitter that is arranged to perform a polarization based splitting to provide first and second intermediate sets of signals; wherein the first and second sets of signals originate from the first intermediate set of signals and the third and fourth sets of signals originate from the second intermediate set of signals;
a polarization changing circuit that is arranged to receive the second and fourth sets of signals and to generate a fifth set of signals; wherein a polarization direction of the fifth set of signals differs from a polarization direction of the first and second intermediate sets of signals;

a detection module that is arranged to generate first, second and third sets of detection signals, in response to the first, third and fifth sets of signals; and a reconstruction module that is arranged to reconstruct the first polarization modulated information and the second polarization modulated information in response to the first, second and third sets of detection signals.

2. The ONU according to claim 1, wherein the polarization changing circuit is a coupler.

3. The ONU according to claim 2, wherein the coupler comprises a first input, a second input and at least one output, wherein the first input is arranged to receive the second set of signals, wherein the second input is arranged to receive the fourth set of signals, and wherein the at least one output is arranged to output fifth set of signals.

4. The ONU according to claim 3 wherein the third sets of detection signals represents (a) a set of sums of signals of the second and fourth sets of signals, and (b) a set of differences between the signals of the second and fourth sets of signals.

5. The ONU according to claim 1 wherein the detection module comprises first, second and third detection circuits that are arranged to generate the first, second and third sets of detection signals, respectively.

6. The ONU according to claim 1 wherein the ONU is a laserless ONU.

7. The ONU according to claim 1 wherein the ONU is coupled to an Optical Line Terminal (OLT), wherein the OLT utilizes a OLT frequency range for communicating with the OLT and multiple additional ONUs, wherein a portion of the OLT frequency range is allocated form upstream and downstream communication with the ONU; wherein the ONU comprises a bandpass filter that passes downstream signals within a bandpass frequency range that comprises the OLT frequency range.

8. The ONU according to claim 1 further comprises a polarization rotator that is arranged to rotate a polarization of one of the first and second intermediate sets of signals.

9. The ONU according to claim 1 further comprises modulator that is arranged to modulate first and second downstream sets of signals to provide an upstream set of signals that comprises upstream information signals;

wherein the first downstream set of signals originates from the first intermediate set of signals and the second downstream set of signals originate from the second intermediate set of signals; and wherein the ONU is further arranged to upstream transmit the upstream set of signals.

10. The ONU according to claim 9 wherein the upstream set of signals propagate through the splitting module.

11. The ONU according to claim 9 wherein the ONU is arranged to transmit the upstream information signals at an upstream information frequency slot that differs from the downstream information frequency slot and from the pilot frequency slot.

12. The ONU according to claim 11, wherein the pilot frequency slot, the downstream information frequency slot, and the upstream information frequency slot have a same bandwidth.

13. A method for exchanging information with an Optical Network Unit (ONU), the method comprising:

receiving, by the ONU, downstream signals that comprise a pilot signal and downstream information signals; wherein the downstream information signals embed first polarization modulated information and second polarization modulated information; wherein the pilot signal is received at a pilot frequency slot and the downstream information signals are received at a downstream information frequency slot that differs from the pilot frequency slot;

splitting the downstream signals to first, second, third and fourth sets of signals; wherein the splitting comprises performing a polarization based splitting to provide first and second intermediate sets of signals; wherein the first and second sets of signals originate from the first intermediate set of signals and the third and fourth sets of signals originate from the second intermediate set of signals;

generating a fifth set of signals by providing the second and fourth sets of signals to a polarization changing circuit, wherein a polarization direction of the fifth set of signals differs from a polarization direction of the first and second intermediate sets of signals;

generating first, second and third sets of detection signals, in response to the first, third and fifth sets of signals; and reconstructing the first polarization modulated information and the second polarization modulated information in response to the first, second and third sets of detection signals.

14. The method according to claim 13, wherein the polarization changing circuit is a coupler.

15. The method according to claim 14, wherein the generating of the fifth set of signals comprises providing the second set of signals to a first input of the coupler, providing the fourth set of signals to a second input of the coupler; and wherein the fifth set of signals is outputted by at least one output of the coupler.

16. The method according to claim 15 wherein the third sets of detection signals represents (a) a set of sums of signals of the second and fourth sets of signals, and (b) a set of differences between the signals of the second and fourth sets of signals.

17. The method according to claim 13 wherein the generating of the first, second and third sets of detection signals is performed by first, second and third detection circuits respectively.

18. The method according to claim 13 wherein the ONU is a laserless ONU.

19. The method according to claim 13 wherein the ONU is coupled to an Optical Line Terminal (OLT), wherein the OLT utilizes a OLT frequency range for communicating with the OLT and multiple additional ONUs, wherein a portion of the OLT frequency range is allocated form upstream and downstream communication with the ONU; wherein the method comprises filtering the downstream signals by a bandpass filter that passes signals within a bandpass frequency range that comprises the OLT frequency range.

20. The method according to claim 13 further comprising modulating first and second downstream sets of signals to provide an upstream set of signals that comprises upstream information signals; wherein the first downstream set of signals originates from the first intermediate set of signals and the second downstream set of signals originate from the second intermediate set of signals; and upstream transmitting the upstream set of signals.

21. The method according to claim 20 wherein the upstream set of signals propagated through a splitting module that performs the splitting of the downstream signals.

22. The method according to claim 20 wherein the upstream information signals are transmitted at an upstream information frequency slot that differs from the downstream information frequency slot and from the pilot frequency slot.

23. The method according to claim 22, wherein the pilot frequency slot, the downstream information frequency slot, and the upstream information frequency slot have a same bandwidth.

24. The method according to claim 13 further comprising rotating by a polarization rotator a polarization of one of the first and second intermediate sets of signals.

\* \* \* \* \*